US012628168B2

(12) United States Patent
Guo et al.

(10) Patent No.: US 12,628,168 B2
(45) Date of Patent: May 12, 2026

(54) COORDINATED SIDELINK RESOURCE ALLOCATION

(71) Applicant: QUALCOMM Incorporated, San Diego, CA (US)

(72) Inventors: Hui Guo, Beijing (CN); Kapil Gulati, Belle Mead, NJ (US); Sudhir Kumar Baghel, Pleasanton, CA (US); Tien Viet Nguyen, Bridgewater, NJ (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 17/904,474

(22) PCT Filed: Apr. 17, 2020

(86) PCT No.: PCT/CN2020/085317
§ 371 (c)(1),
(2) Date: Aug. 17, 2022

(87) PCT Pub. No.: WO2021/208068
PCT Pub. Date: Oct. 21, 2021

(65) Prior Publication Data
US 2023/0103205 A1      Mar. 30, 2023

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0035* (2013.01); *H04W 72/1263* (2013.01); *H04L 5/16* (2013.01)

(58) Field of Classification Search
CPC . H04W 72/21; H04W 72/1263; H04W 76/14; H04W 92/18; H04L 5/0035; H04L 5/16
See application file for complete search history.

(56) References Cited

U.S. PATENT DOCUMENTS

2016/0183121 A1* 6/2016 Kazmi .................. H04W 28/18
                                                                370/230
2016/0381595 A1* 12/2016 Lee ........................ H04W 72/21
                                                                370/329
(Continued)

FOREIGN PATENT DOCUMENTS

CN      107534828 A      1/2018
CN      107615844 A      1/2018
(Continued)

OTHER PUBLICATIONS

"3rd Generation Partnership Project; Technical Specification Group Radio Access Network; NR; Radio Resource Control (RRC) Protocol specification (Release 16)", 3GPP TS 38.331, V16.0.0 (Mar. 2020), 3rd Generation Partnership Project, Mobile Competence Centre, 650, Route Des Lucioles, F-06921 Sophia-Antipolis Cedex, France, vol. RAN WG2, No. V16.0.0, Apr. 6, 2020, pp. 1-835, XP051893854, Par [0735], section 5.5.1, Par "5.5.4.4 Event A3", "5.5.4.5 Event A4", "5.5.4.6 Event A5", sec 5.5.1 and 5.5.5.1, sec 5.7.4.1, sec 5.8.3.3, p. 170-171, p. 188.
(Continued)

*Primary Examiner* — Dady Chery
(74) *Attorney, Agent, or Firm* — Holland & Hart LLP

(57) ABSTRACT

Methods, systems, and devices for wireless communications are described. A first user equipment (UE) may transmit, to a base station, a buffer status report for a first sidelink transmission to a device. The first UE may receive, from a second UE, sidelink control information scheduling the first UE for a time resource for a second sidelink transmission from the second UE, the sidelink control information including an indication of a serving cell identifier of the second UE. The first UE may detect a half-duplex scheduling conflict, or a possible half-duplex scheduling conflict, based on the serving cell identifier and transmit an indication of the conflict to a serving base station. The base station may then
(Continued)

assign, or re-assign, resources for the first sidelink transmission to avoid the scheduling conflict.

30 Claims, 19 Drawing Sheets

(51) Int. Cl.
H04W 72/1263 (2023.01)
*H04L 5/16* (2006.01)

(56) References Cited

U.S. PATENT DOCUMENTS

| | | | | |
|---|---|---|---|---|
| 2019/0124653 | A1 | 4/2019 | Chae et al. | |
| 2019/0254055 | A1* | 8/2019 | Yi | H04W 28/0252 |
| 2019/0268799 | A1* | 8/2019 | Hong | H04W 4/70 |
| 2020/0008183 | A1* | 1/2020 | Chen | H04W 72/20 |
| 2023/0011663 | A1* | 1/2023 | Hong | H04W 72/54 |

FOREIGN PATENT DOCUMENTS

| | | | |
|---|---|---|---|
| WO | WO-2016161609 | A1 | 10/2016 |
| WO | WO-2016163972 | A1 | 10/2016 |
| WO | WO-2017161551 | A1 | 9/2017 |
| WO | 2019017733 | A1 | 1/2019 |
| WO | WO-2019228076 | A1 | 12/2019 |
| WO | WO-2020011336 | A1 | 1/2020 |

OTHER PUBLICATIONS

Supplementary European Search Report—EP20931107—Search Authority—The Hague—Dec. 5, 2023.

LG Electronics Inc: "Discussion on Assistance Information for Resource Allocation in NR SL", 3GPP TSG RAN WG2 Meeting #108, R2-1915513, Resubmission of R2-1913886, Reno, USA, Nov. 18, 2019-Nov. 22, 2019, Nov. 8, 2019, pp. 1-4.

International Search Report and Written Opinion—PCT/CN2020/085317—ISA/EPO—Jan. 15, 2021.

LG Electronics Inc: "Discussion on Assistance Information for Resource Allocation in NR SL", 3GPP TSG RAN WG2 Meeting #107bis, R2-1913886, Chongqing, China, Oct. 14-18, 2019, pp. 1-4, pp. 1-2, Part 2.

VIVO: "Discussion on Mode 1 Resource Allocation Mechanism", 3GPP Draft, 3GPP TSG RAN WG1 #97, R1-1906138, Reno, USA, May 13-17, 2019, May 17, 2019 (May 17, 2019), 13 Pages, p. 3, Part 2.3, the whole document.

* cited by examiner

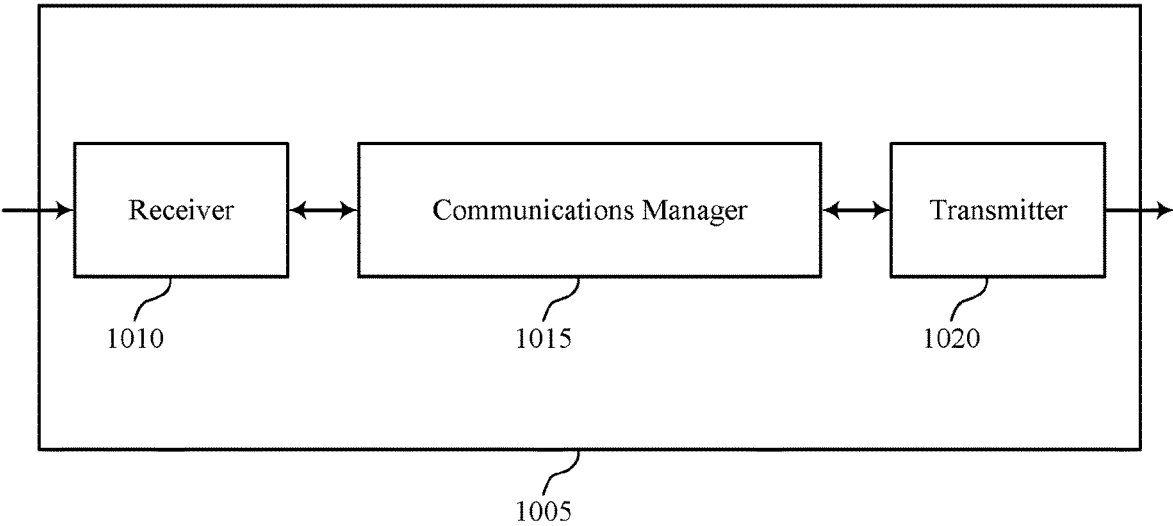
1010             1015             1020
1005
1000
FIG. 10

Transmit, to a base station, a buffer status report for a first sidelink transmission to a device

~ 1405

Receive, from a second UE, sidelink control information scheduling the first UE for a time resource for a second sidelink transmission from the second UE, the sidelink control information including an indication of a serving cell identifier of the second UE

~ 1410

1400

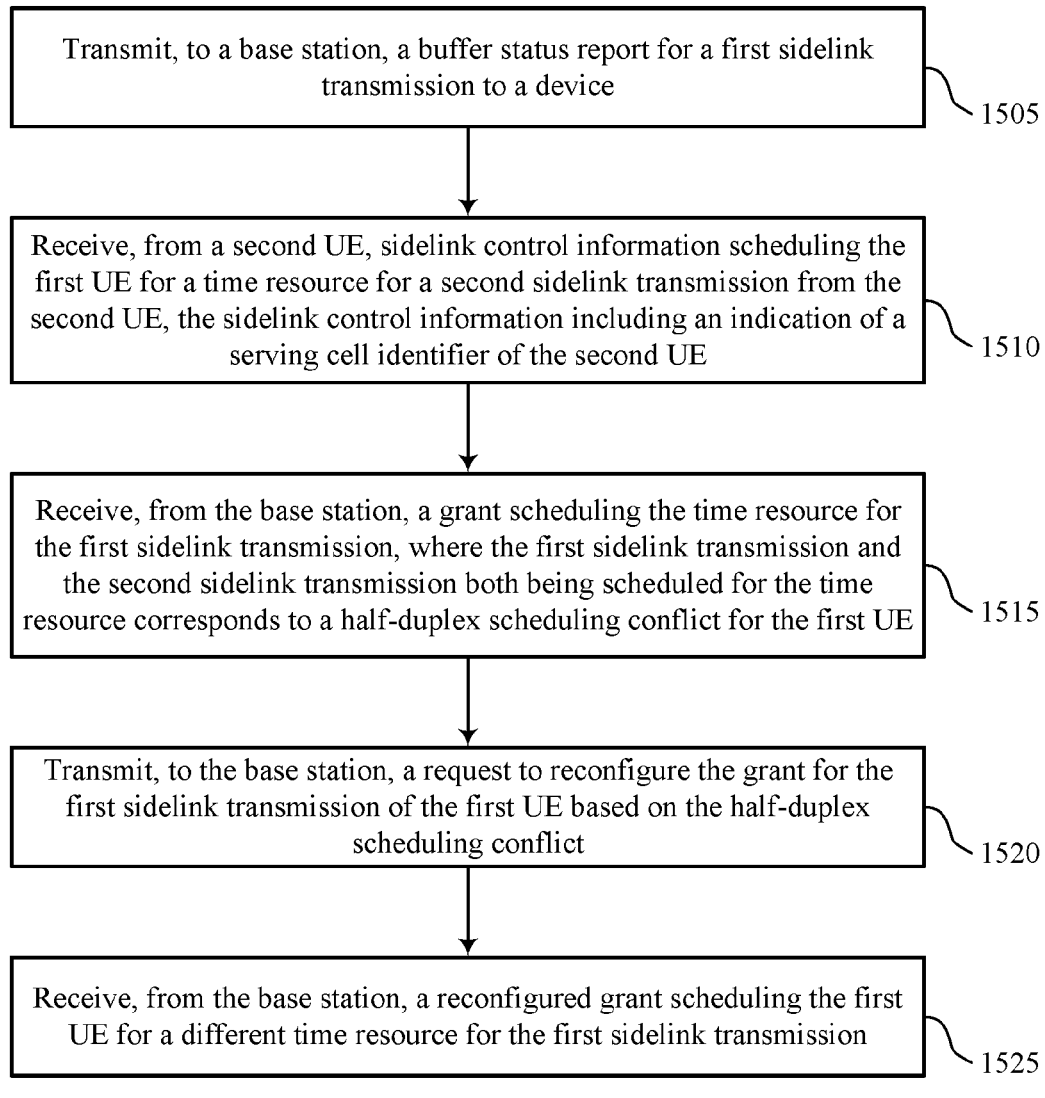

Transmit, to a base station, a buffer status report for a first sidelink transmission to a device

1505

Receive, from a second UE, sidelink control information scheduling the first UE for a time resource for a second sidelink transmission from the second UE, the sidelink control information including an indication of a serving cell identifier of the second UE

1510

Receive, from the base station, a grant scheduling the time resource for the first sidelink transmission, where the first sidelink transmission and the second sidelink transmission both being scheduled for the time resource corresponds to a half-duplex scheduling conflict for the first UE

1515

Transmit, to the base station, a request to reconfigure the grant for the first sidelink transmission of the first UE based on the half-duplex scheduling conflict

1520

Receive, from the base station, a reconfigured grant scheduling the first UE for a different time resource for the first sidelink transmission

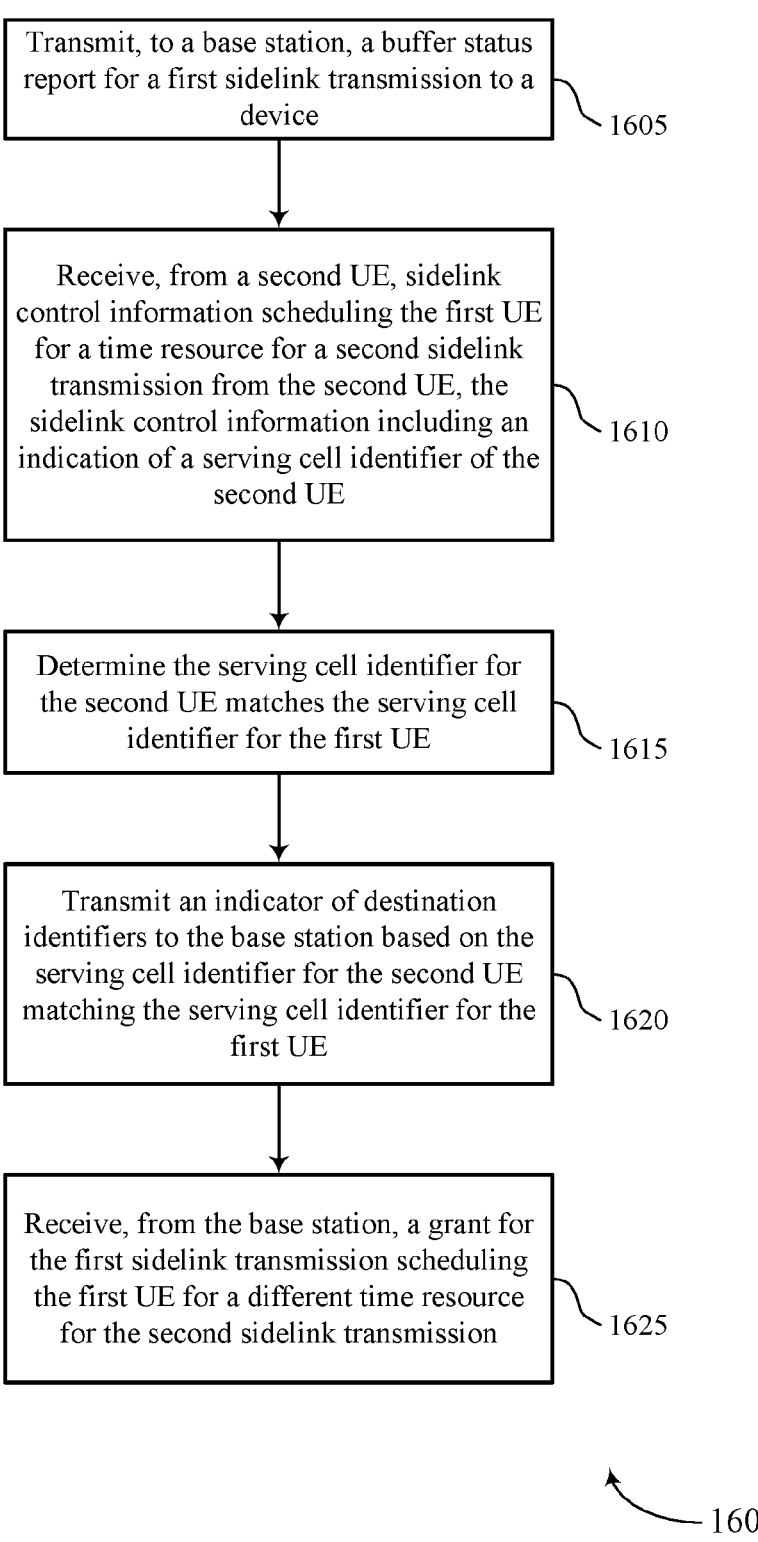

Transmit, to a base station, a buffer status report for a first sidelink transmission to a device
1605

Receive, from a second UE, sidelink control information scheduling the first UE for a time resource for a second sidelink transmission from the second UE, the sidelink control information including an indication of a serving cell identifier of the second UE
1610

Determine the serving cell identifier for the second UE matches the serving cell identifier for the first UE
1615

Transmit an indicator of destination identifiers to the base station based on the serving cell identifier for the second UE matching the serving cell identifier for the first UE
1620

Receive, from the base station, a grant for the first sidelink transmission scheduling the first UE for a different time resource for the second sidelink transmission
1625

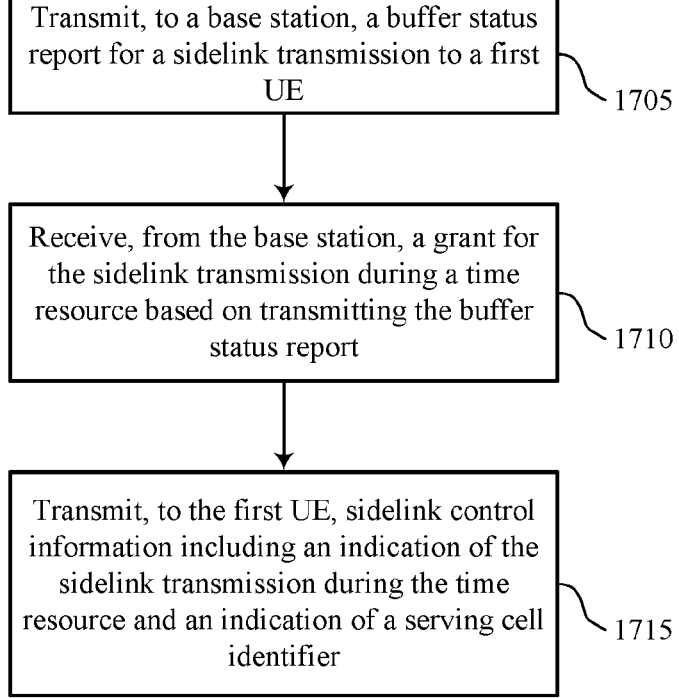

Transmit, to a base station, a buffer status report for a sidelink transmission to a first UE

1705

Receive, from the base station, a grant for the sidelink transmission during a time resource based on transmitting the buffer status report

1710

Transmit, to the first UE, sidelink control information including an indication of the sidelink transmission during the time resource and an indication of a serving cell identifier

Receive, from a first UE, a first buffer status report, corresponding to a first sidelink transmission to a device

1805

Receive, from the first UE, an indicator of a half-duplex scheduling conflict for the first UE based on the first sidelink transmission from the first UE to the device and a second sidelink transmission from a second UE to the first UE

1810

1800

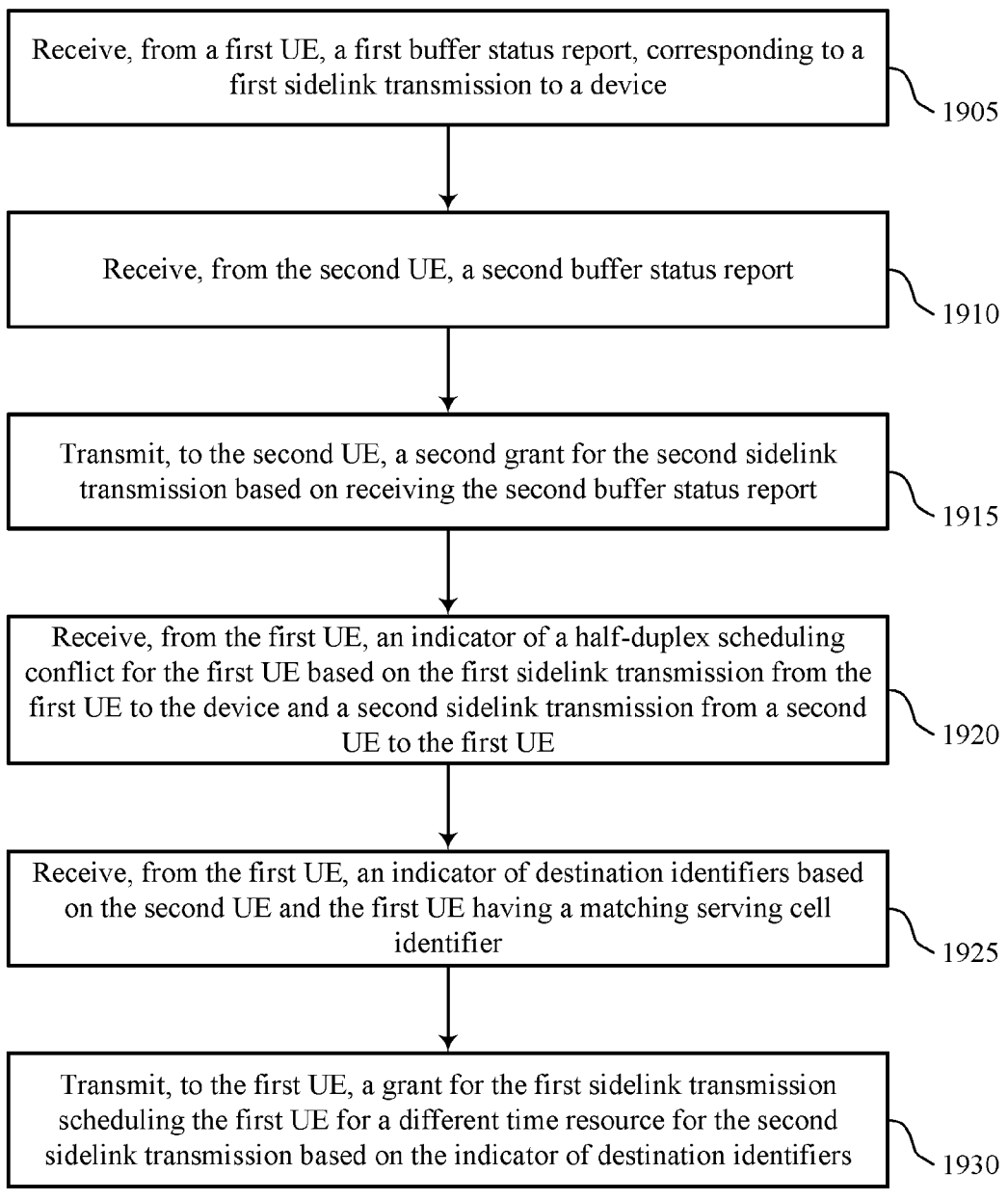

Receive, from a first UE, a first buffer status report, corresponding to a first sidelink transmission to a device

1905

Receive, from the second UE, a second buffer status report

1910

Transmit, to the second UE, a second grant for the second sidelink transmission based on receiving the second buffer status report

1915

Receive, from the first UE, an indicator of a half-duplex scheduling conflict for the first UE based on the first sidelink transmission from the first UE to the device and a second sidelink transmission from a second UE to the first UE

1920

Receive, from the first UE, an indicator of destination identifiers based on the second UE and the first UE having a matching serving cell identifier

1925

Transmit, to the first UE, a grant for the first sidelink transmission scheduling the first UE for a different time resource for the second sidelink transmission based on the indicator of destination identifiers

COORDINATED SIDELINK RESOURCE ALLOCATION

CROSS REFERENCE

The present Application is a 371 national stage filing of International PCT Application No. PCT/CN2020/085317 by Guo et al. entitled "COORDINATED SIDELINK RESOURCE ALLOCATION," filed Apr. 17, 2020, which is assigned to the assignee hereof, and which is expressly incorporated by reference in its entirety herein.

FIELD OF TECHNOLOGY

The following relates generally to wireless communications and more specifically to coordinated sidelink resource allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems support a sidelink for communications between devices. For example, device-to-device (D2D) and vehicle-to-everything (V2X) systems may support communication between UEs on a sidelink. In some cases, a base station may select resources for the UEs on the sidelink. Some techniques of allocating resources on a sidelink while observing certain network constraints, such as half-duplex communicating constraints, can be improved.

SUMMARY

The described techniques relate to improved methods, systems, devices, and apparatuses that support coordinated sidelink resource allocation. A wireless communications system may support devices, such as user equipment (UEs), communicating via a sidelink. In some cases, a base station may allocate resources for sidelink communications between UEs, but the base station may not be aware of the intended receiver of the granted sidelink resource, which may lead to a half-duplex scheduling conflict at one of the UEs. UEs and base stations described herein may implement techniques for coordinated sidelink resource allocation to avoid half duplex scheduling conflicts. A first UE scheduled for both transmitting and receiving sidelink communications may detect the scheduling conflict, or a possibility of a scheduling conflict, and alert a serving cell of the conflict. The first UE may then be rescheduled for its sidelink transmission to avoid the scheduling conflict. In some cases, the first UE may receive sidelink control information from a second UE (e.g., with the pending sidelink transmission to the first UE), where the sidelink control information includes an indicator of a serving cell. The first UE may then apply a technique to avoid a half-duplex scheduling conflict based on whether the second UE has the same or different serving cell. For example, the first UE may either request a grant reconfiguration, or the first UE may report destination identifiers to the serving cell to avoid a scheduling conflict.

A method of wireless communications at a first UE is described. The method may include transmitting, to a base station, a buffer status report for a first sidelink transmission to a device and receiving, from a second UE, sidelink control information scheduling the first UE for a time resource for a second sidelink transmission from the second UE, the sidelink control information including an indication of a serving cell identifier of the second UE.

An apparatus for wireless communications at a first UE is described. The apparatus may include a processor, memory coupled with the processor, and instructions stored in the memory. The instructions may be executable by the processor to cause the apparatus to transmit, to a base station, a buffer status report for a first sidelink transmission to a device and receive, from a second UE, sidelink control information scheduling the first UE for a time resource for a second sidelink transmission from the second UE, the sidelink control information including an indication of a serving cell identifier of the second UE.

Another apparatus for wireless communications at a first UE is described. The apparatus may include means for transmitting, to a base station, a buffer status report for a first sidelink transmission to a device and receiving, from a second UE, sidelink control information scheduling the first UE for a time resource for a second sidelink transmission from the second UE, the sidelink control information including an indication of a serving cell identifier of the second UE.

A non-transitory computer-readable medium storing code for wireless communications at a first UE is described. The code may include instructions executable by a processor to transmit, to a base station, a buffer status report for a first sidelink transmission to a device and receive, from a second UE, sidelink control information scheduling the first UE for a time resource for a second sidelink transmission from the second UE, the sidelink control information including an indication of a serving cell identifier of the second UE.

Some examples of the method, apparatuses, and non-transitory computer-readable medium described herein may further include operations, features, means, or instructions for receiving, from the base station, a grant scheduling the time resource for the first sidelink transmission, where the first sidelink transmission and the second sidelink transmission both being scheduled for the time resource corresponds to a half-duplex scheduling conflict for the first UE, transmitting, to the base station, a request to reconfigure the grant for the first sidelink transmission of the first UE based on the half-duplex scheduling conflict, and receiving, from the base station, a reconfigured grant scheduling the first UE for a different time resource for the first sidelink transmission.

Some examples of the method, apparatuses, and non-transitory computer-readable medium described herein may further include operations, features, means, or instructions for determining the serving cell identifier for the second UE does not match the serving cell identifier for the first UE, where the request to reconfigure the grant may be transmitted based on the determination.

In some examples of the method, apparatuses, and non-transitory computer-readable medium described herein, the request to reconfigure the grant includes a bitmap of slots corresponding to a set of half-duplex scheduling conflicts including at least the half-duplex scheduling conflict.

In some examples of the method, apparatuses, and non-transitory computer-readable medium described herein, the request to reconfigure the grant may be transmitted with feedback for the grant scheduling the time resource for the first sidelink transmission.

In some examples of the method, apparatuses, and non-transitory computer-readable medium described herein, the request to reconfigure the grant may be transmitted based on receiving the sidelink control information, receiving the grant scheduling the first sidelink transmission, or both.

In some examples of the method, apparatuses, and non-transitory computer-readable medium described herein, the request to reconfigure the grant may be based on a priority of the first sidelink transmission, the second sidelink transmission, or both.

Some examples of the method, apparatuses, and non-transitory computer-readable medium described herein may further include operations, features, means, or instructions for determining the serving cell identifier for the second UE does match the serving cell identifier for the first UE.

Some examples of the method, apparatuses, and non-transitory computer-readable medium described herein may further include operations, features, means, or instructions for determining the serving cell identifier for the second UE matches the serving cell identifier for the first UE, transmitting an indicator of destination identifiers to the base station based on the serving cell identifier for the second UE matching the serving cell identifier for the first UE, and receiving, from the base station, a grant for the first sidelink transmission scheduling the first UE for a different time resource for the second sidelink transmission.

Some examples of the method, apparatuses, and non-transitory computer-readable medium described herein may further include operations, features, means, or instructions for receiving the second sidelink transmission from the second UE during the time resource, and transmitting the first sidelink transmission during the different time resource.

Some examples of the method, apparatuses, and non-transitory computer-readable medium described herein may further include operations, features, means, or instructions for determining the first sidelink transmission may be scheduled for the time resource with the second sidelink transmission, determining the first sidelink transmission may have a higher priority than the second sidelink transmission, dropping the second sidelink transmission based on the higher priority, and receiving the first sidelink transmission.

Some examples of the method, apparatuses, and non-transitory computer-readable medium described herein may further include operations, features, means, or instructions for receiving a configuration for avoiding half-duplex scheduling conflicts, where the first sidelink transmission and the second sidelink transmission may be scheduled for a half-duplex scheduling conflict.

In some examples of the method, apparatuses, and non-transitory computer-readable medium described herein, the configuration for avoiding half-duplex scheduling conflicts may be received by higher layer signaling, the sidelink control information, downlink control information including a sidelink grant, or a combination thereof.

In some examples of the method, apparatuses, and non-transitory computer-readable medium described herein, the configuration for avoiding half-duplex scheduling conflicts may be based on a first priority of the first sidelink transmission, a second priority of the second sidelink transmission, or both.

In some examples of the method, apparatuses, and non-transitory computer-readable medium described herein, the first sidelink transmission, the second sidelink transmission, or both, may be transmitted via a PC5 interface.

In some examples of the method, apparatuses, and non-transitory computer-readable medium described herein, the indication of the serving cell identifier corresponds to one or more least significant bits of the serving cell identifier of the second UE.

A method of wireless communications at a second UE is described. The method may include transmitting, to a base station, a buffer status report for a sidelink transmission to a first UE, receiving, from the base station, a grant for the sidelink transmission during a time resource based on transmitting the buffer status report, and transmitting, to the first UE, sidelink control information including an indication of the sidelink transmission during the time resource and an indication of a serving cell identifier.

An apparatus for wireless communications at a second UE is described. The apparatus may include a processor, memory coupled with the processor, and instructions stored in the memory. The instructions may be executable by the processor to cause the apparatus to transmit, to a base station, a buffer status report for a sidelink transmission to a first UE, receive, from the base station, a grant for the sidelink transmission during a time resource based on transmitting the buffer status report, and transmit, to the first UE, sidelink control information including an indication of the sidelink transmission during the time resource and an indication of a serving cell identifier.

Another apparatus for wireless communications at a second UE is described. The apparatus may include means for transmitting, to a base station, a buffer status report for a sidelink transmission to a first UE, receiving, from the base station, a grant for the sidelink transmission during a time resource based on transmitting the buffer status report, and transmitting, to the first UE, sidelink control information including an indication of the sidelink transmission during the time resource and an indication of a serving cell identifier.

A non-transitory computer-readable medium storing code for wireless communications at a second UE is described. The code may include instructions executable by a processor to transmit, to a base station, a buffer status report for a sidelink transmission to a first UE, receive, from the base station, a grant for the sidelink transmission during a time resource based on transmitting the buffer status report, and transmit, to the first UE, sidelink control information including an indication of the sidelink transmission during the time resource and an indication of a serving cell identifier.

Some examples of the method, apparatuses, and non-transitory computer-readable medium described herein may further include operations, features, means, or instructions for receiving, from the base station, a reconfigured grant for the sidelink transmission, where the reconfigured grant schedules the sidelink transmission for a different time resource based on transmitting the sidelink control information including the indication of the serving cell identifier.

Some examples of the method, apparatuses, and non-transitory computer-readable medium described herein may further include operations, features, means, or instructions for transmitting the sidelink transmission to the first UE during the time resource.

Some examples of the method, apparatuses, and non-transitory computer-readable medium described herein may further include operations, features, means, or instructions for transmitting a configuration for avoiding half-duplex scheduling conflicts to the first UE via the sidelink control information.

In some examples of the method, apparatuses, and non-transitory computer-readable medium described herein, the sidelink transmission may be transmitted via a PC5 interface.

In some examples of the method, apparatuses, and non-transitory computer-readable medium described herein, the indication of the serving cell identifier corresponds to one or more least significant bits of the serving cell identifier.

A method of wireless communications at a base station is described. The method may include receiving, from a first UE, a first buffer status report, corresponding to a first sidelink transmission to a device and receiving, from the first UE, an indicator of a half-duplex scheduling conflict for the first UE based on the first sidelink transmission from the first UE to the device and a second sidelink transmission from a second UE to the first UE.

An apparatus for wireless communications at a base station is described. The apparatus may include a processor, memory coupled with the processor, and instructions stored in the memory. The instructions may be executable by the processor to cause the apparatus to receive, from a first UE, a first buffer status report, corresponding to a first sidelink transmission to a device and receive, from the first UE, an indicator of a half-duplex scheduling conflict for the first UE based on the first sidelink transmission from the first UE to the device and a second sidelink transmission from a second UE to the first UE.

Another apparatus for wireless communications at a base station is described. The apparatus may include means for receiving, from a first UE, a first buffer status report, corresponding to a first sidelink transmission to a device and receiving, from the first UE, an indicator of a half-duplex scheduling conflict for the first UE based on the first sidelink transmission from the first UE to the device and a second sidelink transmission from a second UE to the first UE.

A non-transitory computer-readable medium storing code for wireless communications at a base station is described. The code may include instructions executable by a processor to receive, from a first UE, a first buffer status report, corresponding to a first sidelink transmission to a device and receive, from the first UE, an indicator of a half-duplex scheduling conflict for the first UE based on the first sidelink transmission from the first UE to the device and a second sidelink transmission from a second UE to the first UE.

Some examples of the method, apparatuses, and non-transitory computer-readable medium described herein may further include operations, features, means, or instructions for transmitting, to the first UE, a grant scheduling a time resource for the first sidelink transmission, receiving, from the first UE, a request to reconfigure the grant for the first sidelink transmission based on the half-duplex scheduling conflict, and transmitting, to the first UE, a reconfigured grant for the first sidelink transmission based on the request and the half-duplex scheduling conflict.

In some examples of the method, apparatuses, and non-transitory computer-readable medium described herein, the indicator includes a bitmap of slots corresponding to a set of half-duplex scheduling conflicts for the first UE including at least the half-duplex scheduling conflict.

In some examples of the method, apparatuses, and non-transitory computer-readable medium described herein, the request to reconfigure the grant may be received with feedback for the grant for the first sidelink transmission.

Some examples of the method, apparatuses, and non-transitory computer-readable medium described herein may further include operations, features, means, or instructions for receiving, from the second UE, a second buffer status report, transmitting, to the second UE, a second grant for the second sidelink transmission based on receiving the second buffer status report, receiving, from the first UE, an indicator of destination identifiers based on the second UE and the first UE having a matching serving cell identifier, and transmitting, to the first UE, a grant for the first sidelink transmission scheduling the first UE for a different time resource for the second sidelink transmission based on the indicator of destination identifiers.

Some examples of the method, apparatuses, and non-transitory computer-readable medium described herein may further include operations, features, means, or instructions for transmitting a configuration for avoiding half-duplex scheduling conflicts via higher layer signaling, downlink control information including a sidelink grant, or both.

In some examples of the method, apparatuses, and non-transitory computer-readable medium described herein, the configuration for avoiding half-duplex scheduling conflicts may be based on a first priority of the first sidelink transmission, a second priority of the second sidelink transmission, or both.

In some examples of the method, apparatuses, and non-transitory computer-readable medium described herein, the first sidelink transmission, the second sidelink transmission, or both, may be transmitted via a PC5 interface.

BRIEF DESCRIPTION OF THE DRAWINGS

FIGS. 10 and 11 show block diagrams of devices that support coordinated sidelink resource allocation in accordance with aspects of the present disclosure.

FIGS. 14 through 19 show flowcharts illustrating methods that support coordinated sidelink resource allocation in accordance with aspects of the present disclosure.

DETAILED DESCRIPTION

Figure 1:
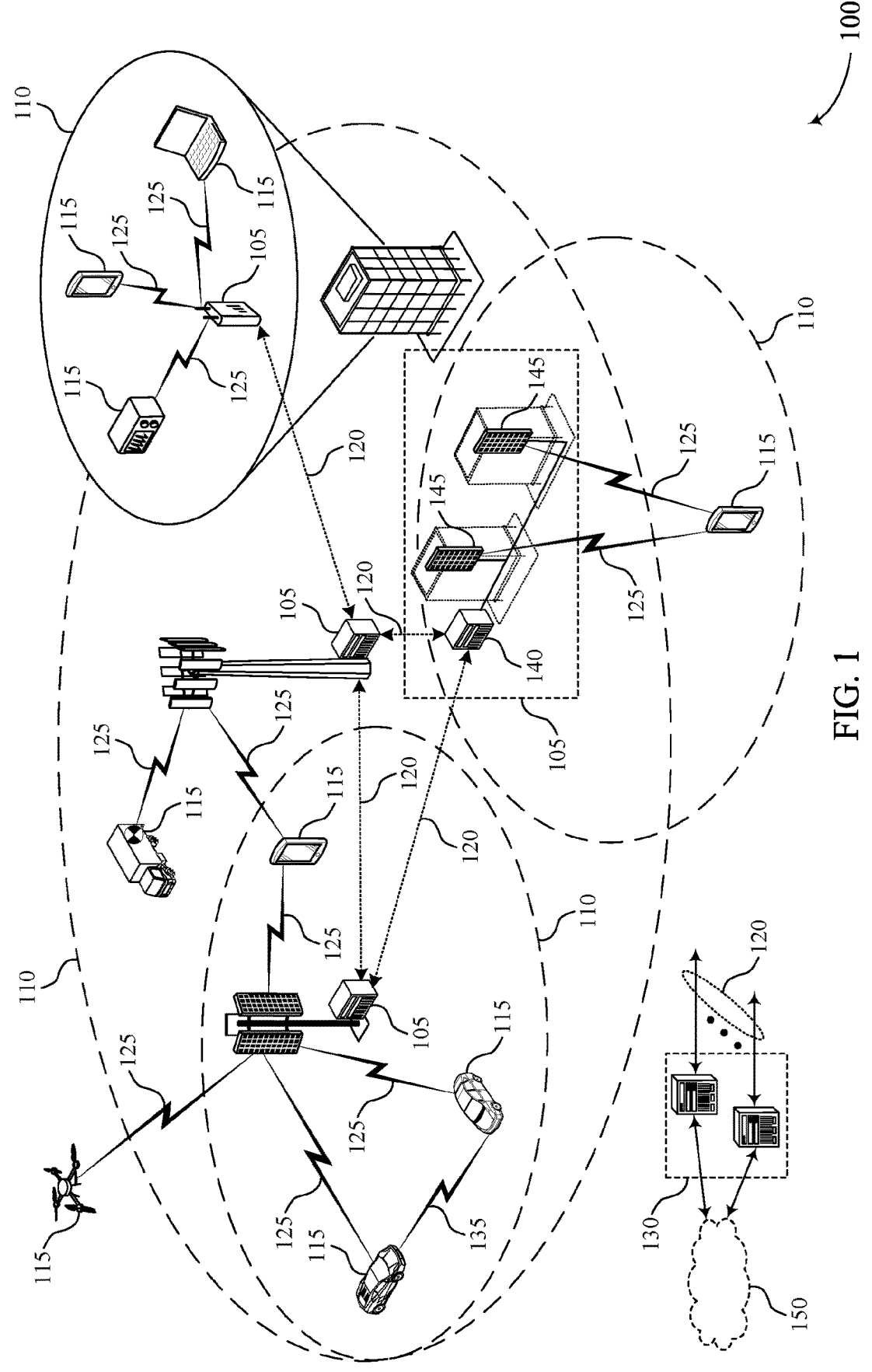
FIG. 1 illustrates an example of a system for wireless communications that supports coordinated sidelink resource allocation in accordance with aspects of the present disclosure.

A wireless communications system may support devices communicating via a sidelink. For example, in device-to-device (D2D) or vehicle-to-everything (V2X) systems, a user equipment (UE) may communicate with another UE on a sidelink. In some cases, devices communicating using the sidelink may operate according to a half-duplex constraint in order to conserve power usage, where the half duplex constraint restricts a wireless device to either transmitting or receiving at a time. In some cases, the UEs involved in the sidelink communications may autonomously select the time and frequency resources for the sidelink communications. Additionally, or alternatively, a base station may allocate resources for sidelink communications between UEs. A UE may send a buffer stats report (BSR) to the base station to request resources, and the base station may send a sidelink grant with a resource allocation for the sidelink transmission. In some cases, if a base station allocates resources for sidelink communications, the base station may not be aware of the intended receiver of the granted sidelink resource. In some cases, the base station may grant a sidelink resource to a first UE, but the base station may not be aware that the recipient of the transmission from the first UE (e.g., a second UE) is already granted sidelink resources to transmit at the same time. Therefore, the second UE may be scheduled to both transmit and receive on the sidelink resource at the same time, which may not follow the half-duplex constraint and lead to a scheduling conflict.

The techniques herein describe a coordinated sidelink resource allocation to avoid half duplex scheduling conflicts. A first UE scheduled for both transmitting and receiving sidelink communications may detect the scheduling conflict, or a possibility of a scheduling conflict, and alert a serving cell of the conflict. The first UE may then be rescheduled for its sidelink transmission to avoid the scheduling conflict. In some cases, the first UE may receive sidelink control information from a second UE, with the pending sidelink transmission to the first UE, the sidelink control information including an indicator of a serving cell. The first UE may then apply a technique to avoid a half-duplex scheduling conflict based on whether the second UE has the same or different serving cell. In some cases, the first UE may determine that the second UE has the same serving cell. In this example, the first UE may send destination identifiers to the base station, indicating that the first UE is a target recipient of the sidelink transmission from the second UE. The base station may then schedule the first UE to avoid the half-duplex scheduling conflict. If the first UE and the second UE do not have the same serving cell, the first UE may send a request for a grant reconfiguration to its serving base station. The first UE may then receive a reconfigured grant with a different resource allocation to avoid the half-duplex scheduling conflict. In some cases, the first UE may request a grant reconfiguration if the first UE and the second UE have the same serving cell. Additional techniques for configuring a coordination scheme are described herein, so the first UE can determine when to request reconfiguration and when to indicate destination identifiers.

Aspects of the disclosure are initially described in the context of wireless communications systems. Aspects of the disclosure are further illustrated by and described with reference to apparatus diagrams, system diagrams, and flowcharts that relate to coordinated sidelink resource allocation.

FIG. 1 illustrates an example of a wireless communications system 100 that supports coordinated sidelink resource allocation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications. In some cases, a base station 105 may allocate resources for sidelink communications between UEs 115, but the base station 105 may not be aware the intended receiver of the granted sidelink resource, which may lead to a half-duplex scheduling conflict at one of the UEs 115. UEs 115 and base stations 105 described herein may implement techniques for coordinated sidelink resource allocation to avoid half duplex scheduling conflicts. A first UE 115 scheduled for both transmitting and receiving sidelink communications may detect the scheduling conflict, or a possibility of a scheduling conflict, and alert a serving cell of the conflict. The first UE 115 may then be rescheduled for its sidelink transmission to avoid the scheduling conflict. In some cases, the first UE 115 may receive sidelink control information from a second UE 115 (e.g., with the pending sidelink transmission to the first UE 115), where the sidelink control information includes an indicator of a serving cell. The first UE 115 may then apply a technique to avoid a half-duplex scheduling conflict based on whether the second UE 115 has the same or different serving cell. For example, the first UE 115 may either request a grant reconfiguration, or the first UE 115 may report destination identifiers to the serving cell to avoid a scheduling conflict.

Figure 2:
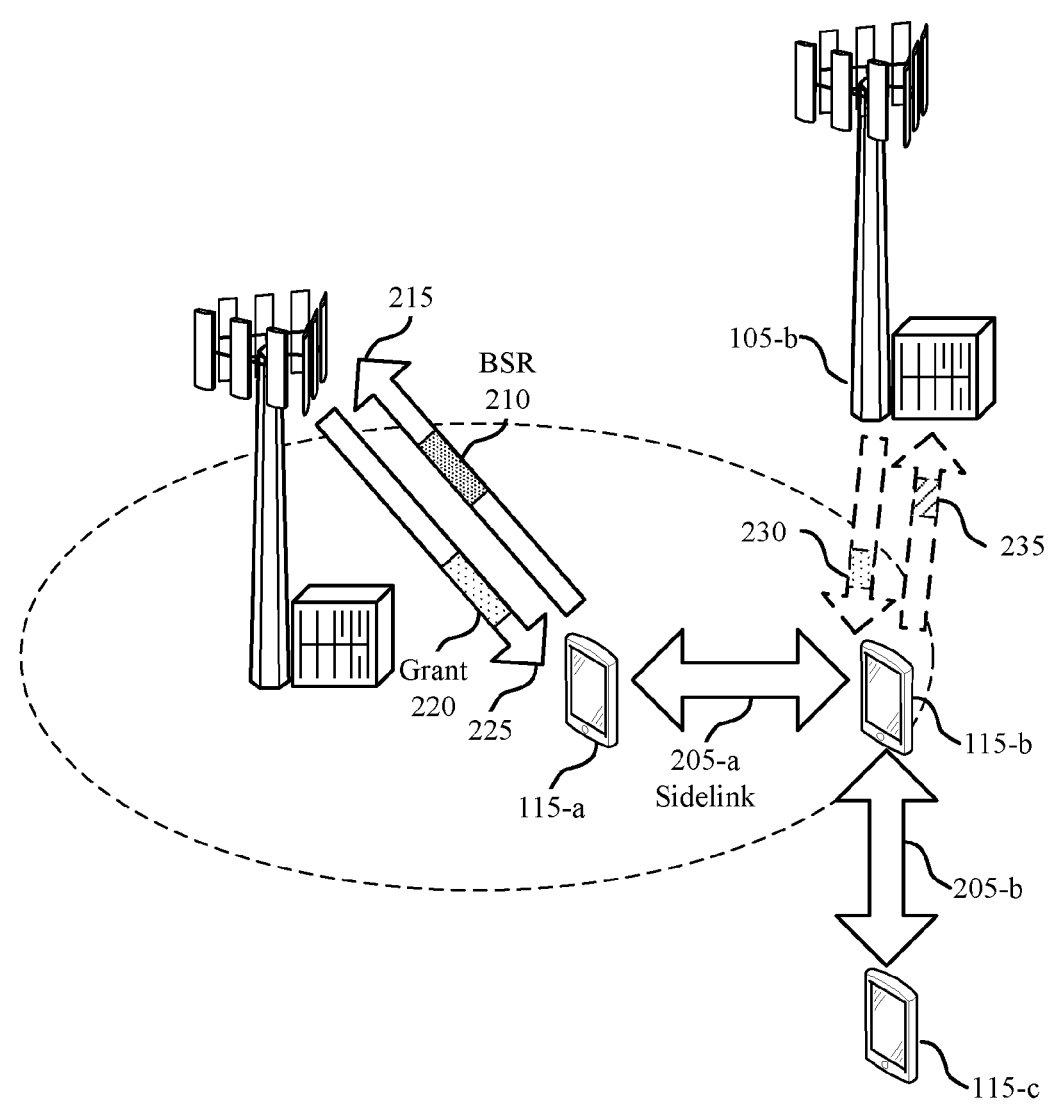
FIG. 2 illustrates an example of a wireless communications system that supports coordinated sidelink resource allocation in accordance with aspects of the present disclosure.

FIG. 2 illustrates an example of a wireless communications system 200 that supports coordinated sidelink resource allocation in accordance with aspects of the present disclosure. In some examples, the wireless communications system 200 may implement aspects of wireless communication system 100. The wireless communications system 200 may include base station 105-a, which may be an example of a base station 105 described herein. The wireless communications system 200 may include UE 115-a, UE 115-b, and UE 115-c, which may each be an example of a UE 115 described herein.

The wireless communications system 200 may support sidelink communications. For example, UE 115-a and UE 115-b may communicate on sidelink 205-a. In some cases, the wireless communications system 200 may be an example of a V2X system, where UEs 115-a, 115-b, and 115-c may be vehicle UEs, pedestrian UEs, relay devices, or a combination thereof.

In some cases, the UEs 115 may operate according to a half-duplex constraint. For example, to conserve power, the UEs 115 may either transmit on a sidelink 205 or receive on the sidelink 205, but the UEs 115 may not both transmit and receive at the same time. This may provide power savings for D2D devices or V2X devices, leading to a longer lifetime without having to replace these devices.

Sidelink resource assignment may normally be handled according to one of two modes. In a first mode, the UEs 115 involved in the sidelink communications may autonomously select the time and frequency resources for the sidelink communications. In a second mode, base station 105-a may allocate resources for sidelink communications between UEs 115. For example, UE 115-a may send a BSR 210 to base station 105-a on an uplink 215 to request resources, and base station 105-a may send a sidelink grant 220 on a downlink 225 with a resource allocation for a sidelink transmission on sidelink 205-a. The BSR 210 may provide the serving base station 105 with information about sidelink data volume of logical channel IDs to each destination ID.

In some cases, if base station 105-a allocates resources for sidelink communications, base station 105-a may be ignorant of the intended receiver of the granted sidelink resource. For example, base station 105-a may grant a sidelink resource to UE 115-a, but base station 105-a may not be aware that the recipient of the transmission from UE 115-a (e.g., UE 115-b) has already been granted sidelink resources to transmit at the same time. Therefore, UE 115-b may be scheduled to both transmit to UE 115-c on sidelink 205-b and receive from UE 115-a on sidelink 205-a at the same time, which may not follow the half-duplex constraint and lead to a scheduling conflict.

The techniques herein describe a coordinated sidelink resource allocation to avoid half duplex scheduling conflicts. UE 115-b may detect the scheduling conflict, or a possibility of a scheduling conflict, and alert a serving cell of the conflict. UE 115-b may then be rescheduled for the sidelink transmission to UE 115-c to avoid the scheduling conflict. In some cases, UE 115-b may receive sidelink control information from UE 115-a including an indicator of a serving cell (e.g., corresponding to base station 105-a). In some cases, UE 115-b may apply a technique to avoid a half-duplex scheduling conflict based on whether UE 115-a has the same or different serving cell.

In some cases, UE 115-b may determine that UE 115-a has the same serving cell. For example, base station 105-a may serve UE 115-b and UE 115-a. Upon decoding sidelink control information from UE 115-a, UE 115-b may report destination identifiers to base station 105-a in sidelink assistance information. In this example, UE 115-*b* may send destination identifiers to base station 105-*a*, indicating that UE 115-*b* is a target recipient of the sidelink transmission from UE 115-*b*. Based on the destination identifiers, base station 105-*a* may be aware of potential destination identifiers that UE 115-*b* is going to receive sidelink data on. Base station 105-*b* may then schedule the sidelink transmission from UE 115-*b* to avoid the half-duplex scheduling conflict.

In some cases, UE 115-*b* may determine that UE 115-*a* has a different serving cell. For example, UE 115-*b* may be served by base station 105-*b*. In this example, upon receiving a sidelink grant from UE 115-*a* or from base station 105-*b*, UE 115-*b* may send a request 235 for a grant reconfiguration to base station 105-*b*. UE 115-*b* may then receive a reconfigured grant 230 with a different resource allocation to avoid the half-duplex scheduling conflict. In some cases, UE 115-*b* may include a time-bitmap of slots in which UE 115-*b* has half-duplex conflicts. In some cases, the request 235 may be sent as part of feedback to the original sidelink grant. Base station 105-*b*, when reconfiguring the grant, may consider the priority of the packets causing the half-duplex conflict. For example, base station 105-*b* may refrain from increasing latency of high priority packets when rescheduling UE 115-*b*. In some cases, base station 105-*b* may indicate the conflict to base station 105-*a* (e.g., over backhaul links), and base station 105-*a* may reschedule UE 115-*a*. In some cases, UE 115-*b* may determine to drop one or more of the sidelink transmissions to receive the other sidelink transmission if the dropped sidelink transmission is of lower priority.

In some cases, UE 115-*b* may request a grant reconfiguration if the first UE and the second UE have the same serving cell. For example, the techniques of reconfiguring the sidelink grant may be applicable for both intra-cell and inter-cell scenarios (e.g., as described with reference to FIG. 3).

Additional techniques for configuring a coordination scheme are described herein, so UE 115-*b* can determine when to request reconfiguration and when to indicate destination identifiers. For example, UE 115-*a* may indicate a serving cell identifier in SCI to UE 115-*b*. UE 115-*b* receives the SCI and checks to see if UE 115-*a* has the same serving cell as UE 115-*b*. If the serving cells are the same, and UE 115-*b* is interested in receiving the transmission from UE 115-*a*, UE 115-*b* may indicate the L2 destination identifiers to the serving cell of UE 115-*b*. This may prevent UE 115-*b* from being scheduled for a half-duplex conflict. If the serving cell indicated by UE 115-*a* is different than the serving cell of UE 115-*b*, then UE 115-*b* may transmit the grant reconfiguration request to the serving cell of UE 115-*b* to avoid the half-duplex conflict. In some cases, UE 115-*a* may send an indicator of the serving cell, such as a few least significant bits of the serving cell identifier.

The techniques for coordinating sidelink resource allocation may be configured. For example, whether to trigger a UE coordination scheme to avoid a half-duplex collision by implementing any one or more of the techniques described above may be controlled by configuration. In some cases, the coordination schemes may be configured by higher layer signaling, such as RRC signaling. In some cases, the coordination schemes may be configured by SCI or downlink control information (e.g., used to carry a sidelink grant). In some cases, the configuration may be based on packet priority level. For example, the sidelink resource allocation coordination scheme may ensure that high priority packets are transmitted and received without half-duplex collisions.

Figure 3:
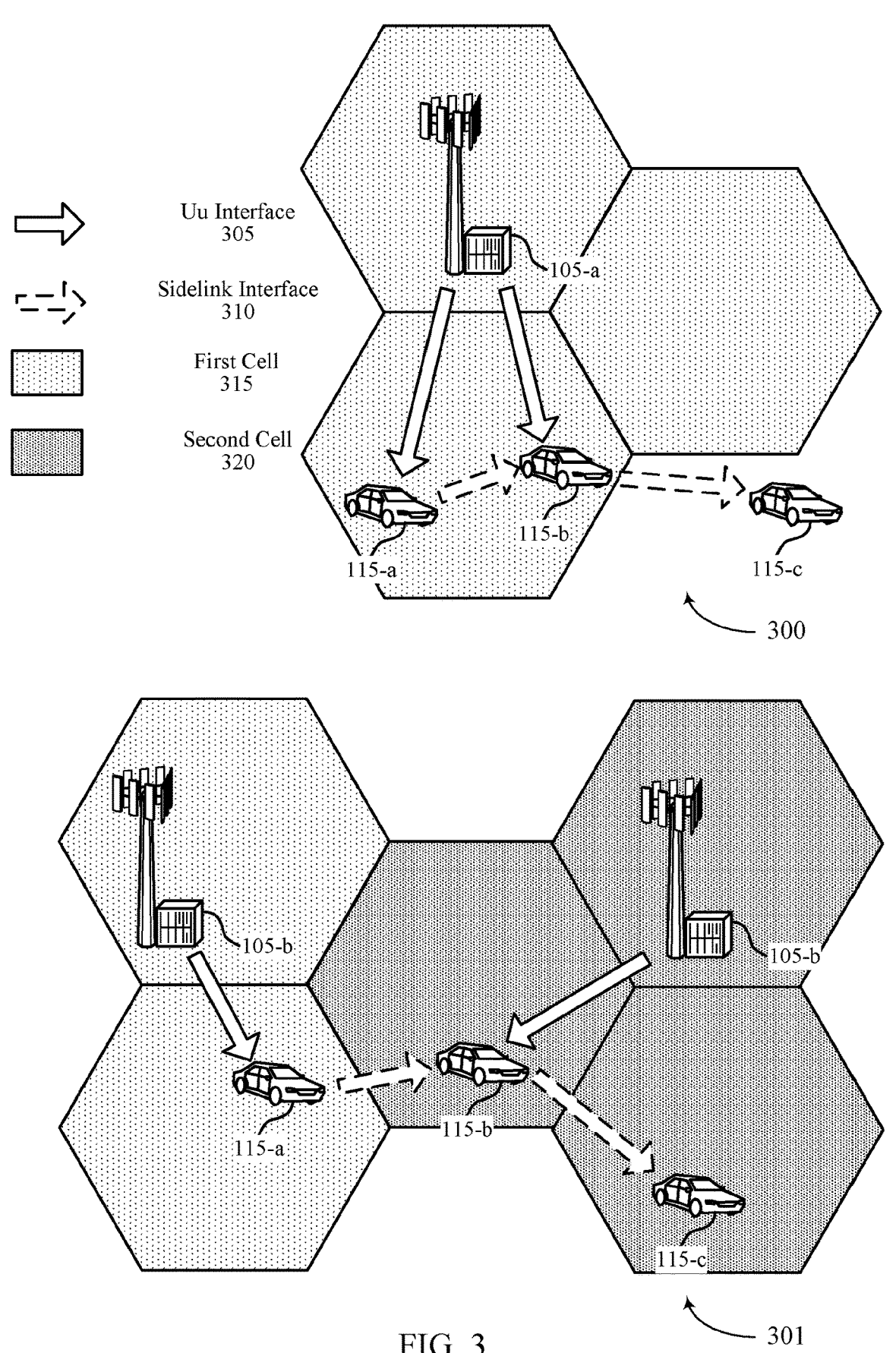
FIG. 3 illustrates examples of intra-cell and inter-cell configurations that support coordinated sidelink resource allocation in accordance with aspects of the present disclosure.

FIG. 3 illustrates examples of an intra-cell configuration 300 and an inter-cell configuration 301 that support coordinated sidelink resource allocation in accordance with aspects of the present disclosure. In some examples, the intra-cell configuration 300 and the inter-cell configuration 301 may implement aspects of wireless communication system 100. The intra-cell configuration 300 and the inter-cell configuration 301 may include base station 105-*a*, UE 115-*a*, UE 115-*b*, and UE 115-*c*, which may be respective examples of a base station 105 or a UE 115 as described herein. The inter-cell configuration 301 may include base station 105-*b*, which may be an example of a base station 105 described herein.

The UEs 115 may communicate with a serving base station 105 via a Uu interface 305. The UEs 115 may communicate with each other over a sidelink via a sidelink interface 310. A base station 105 may provide a cell, where UEs 115 within the coverage area of the cell are served by the corresponding base station 105. For example, base station 105-*a* may provide a first cell 315, and base station 105-*b* may provide a second cell 320.

In the intra-cell configuration 300, base station 105-*a* may serve UE 115-*a* and UE 115-*b*. According to the techniques described herein, UE 115-*a*, UE 115-*b*, and base station 105-*a* may implement techniques in the intra-cell configuration 300 to avoid a half-duplex conflict at UE 115-*b*. For example, UE 115-*b* may avoid being scheduled for a half-duplex conflict by reporting destination identifiers to base station 105-*a* in sidelink assistance information, so that base station 105-*a* is aware of potential destination identifiers that UE 115-*b* is going to receive sidelink data on. Base station 105-*a* may schedule UE 115-*b* for a sidelink transmission to UE 115-*c* accordingly to avoid the half-duplex conflict. In some cases, the intra-cell configuration 300 may implement a technique where UE 115-*b* receives a grant from base station 105-*a* resulting in the half-duplex conflict. To avoid the half-duplex conflict, UE 115-*b* may transmit a request for the grant to be reconfigured and for UE 115-*b* to re-assigned resources for the sidelink transmission to UE 115-*c*.

In the inter-cell configuration 301, base station 105-*a* may serve UE 115-*a*, and base station 105-*b* may serve UE 115-*b*. According to the techniques described herein, UE 115-*a*, UE 115-*b*, and base station 105-*a* may implement techniques in the inter-cell configuration 301 to avoid a half-duplex conflict at UE 115-*b*. For example, UE 115-*b* may receive a grant from base station 105-*b* allocating resources for a sidelink transmission to UE 115-*c*. UE 115-*b* may also receive SCI from UE 115-*a* indicating a sidelink transmission to UE 115-*b* at the same time. UE 115-*a* may include a serving cell identifier in the sidelink control information, and UE 115-*b* may check whether UE 115-*a* has the same serving cell or not. UE 115-*b* may determine that UE 115-*a* has a different serving cell. UE 115-*b* may transmit a request to base station 105-*b* for the grant to be reconfigured and for UE 115-*b* to re-assigned resources for the sidelink transmission to UE 115-*c*.

Figure 4:
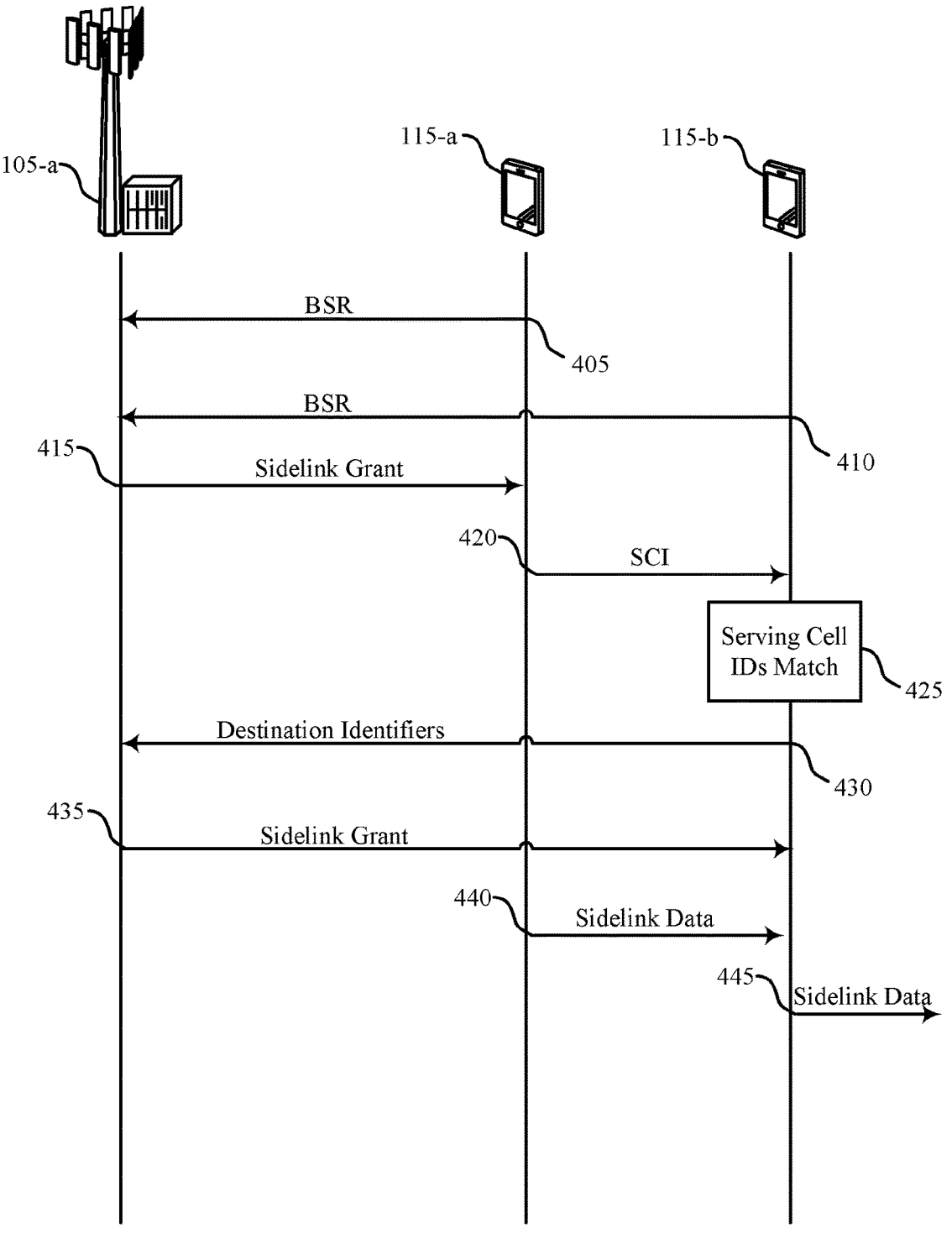
FIG. 4 illustrates an example of a process flow that supports coordinated sidelink resource allocation in accordance with aspects of the present disclosure.

FIG. 4 illustrates an example of a process flow 400 that supports coordinated sidelink resource allocation in accordance with aspects of the present disclosure. In some examples, process flow 400 may implement aspects of wireless communication system 100. The process flow 400 may include base station 105-*a*, UE 115-*a*, UE 115-*b*, and UE 115-*c*, which may be respective examples of a base station 105 or a UE 115 as described herein. Base station 105-*a* may serve UE 115-*a* and UE 115-*b*.

At 405, UE 115-*a* may transmit, to base station 105-*a*, a BSR for a sidelink transmission to UE 115-*b*. At 410, UE 115-*b* may transmit, to base station 105-*a*, a BSR for a sidelink transmission to a device (e.g., a third UE 115 not shown). At 415, UE 115-*a* may receive, from base station 105-*a*, a grant for the sidelink transmission to UE 115-*b* during a time resource based on transmitting the buffer status report. At 420, UE 115-*a* may transmit, to UE 115-*b*, SCI including an indication of the sidelink transmission during the time resource and an indication of a serving cell identifier for UE 115-*a*.

UE 115-*b* may check the serving cell identifier of UE 115-*a* with its own serving cell identifier. At 425, UE 115-*b* may determine that the serving identifier of UE 115-*a* matches the serving cell identifier of UE 115-*b*.

At 430, UE 115-*b* may transmit an indicator of destination identifiers to base station 105-*a* based on the serving cell identifier for UE 115-*a* matching the serving cell identifier for UE 115-*b*. For example, UE 115-*b* may let base station 105-*a* know that UE 115-*b* is the intended receiver of destinations {Layer2-ID1, Layer2-ID2}. Base station 105-*a* may determine that it has given a grant for transmission to destination Layer2-ID1. Then, when UE 115-*b* requests transmission resources (e.g., with destination Layer2-ID3 of which the device is one of the intended receivers), then base station 105-*a* grants proper resources to UE 115-*b* as to avoid the same time slots as the grant given to UE 115-*a*.

For example, UE 115-*b* indicates that it is an intended receiver of the sidelink transmission from UE 115-*a*. Base station 105-*a* has also received a request for resources from UE 115-*b*, and base station 105-*a* may allocate the resources to UE 115-*b* while avoiding a half-duplex scheduling conflict for UE 115-*b*.

At 435, UE 115-*b* may receive, from base station 105-*a*, a grant for the sidelink transmission to the third UE 115 for a different time resource than the second sidelink transmission.

At 440, UE 115-*a* may transmit the sidelink transmission to UE 115-*b*. At 445, during a different time resource, UE 115-*b* may transmit the sidelink transmission to the third UE 115.

Figure 5:
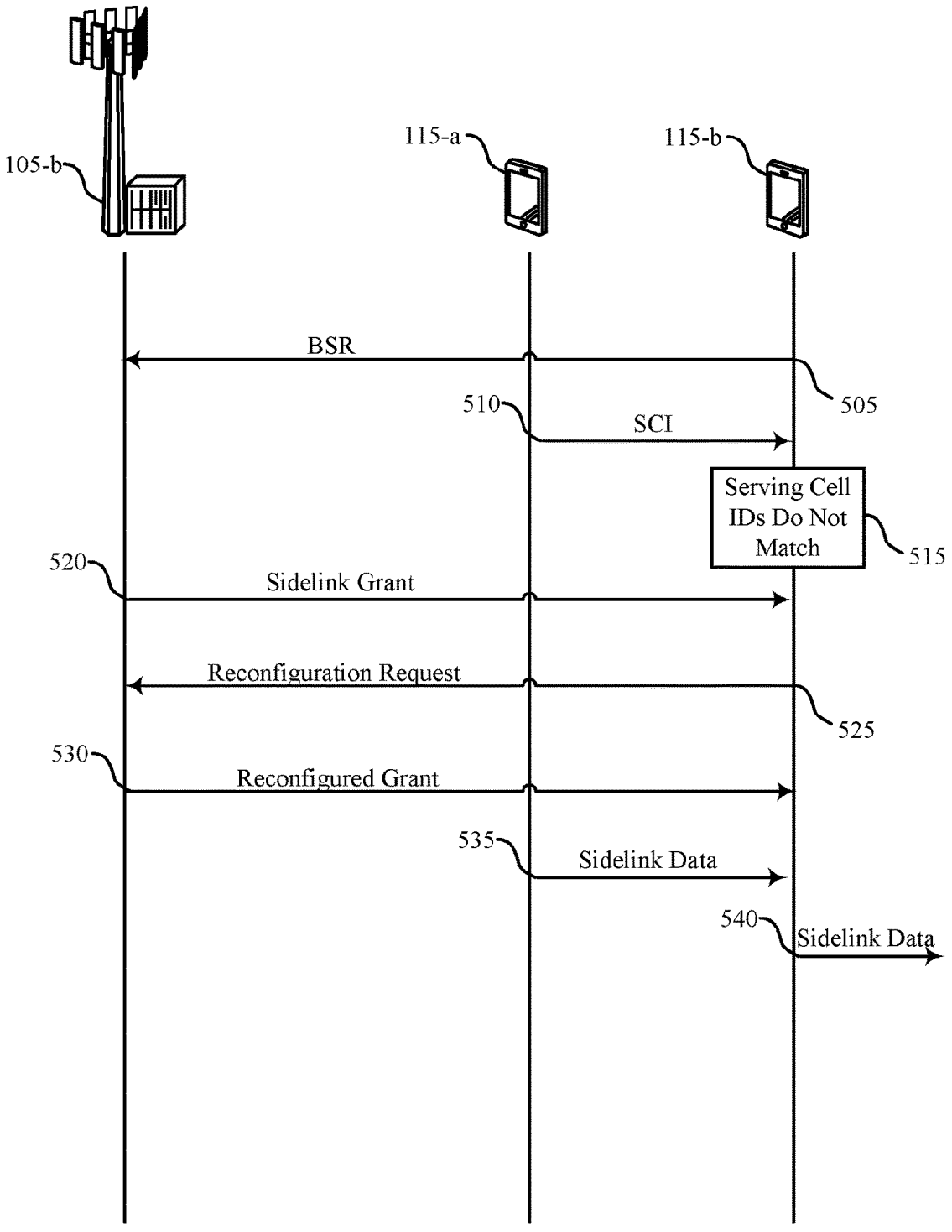
FIG. 5 illustrates an example of a process flow that supports coordinated sidelink resource allocation in accordance with aspects of the present disclosure.

FIG. 5 illustrates an example of a process flow 500 that supports coordinated sidelink resource allocation in accordance with aspects of the present disclosure. In some examples, process flow 500 may implement aspects of wireless communication system 100. The process flow 500 may include base station 105-*b*, UE 115-*a*, UE 115-*b*, and UE 115-*c*, which may be respective examples of a base station 105 or a UE 115 as described herein. Base station 105-*b* may serve UE 115-*b*. UE 115-*a* may, in some cases, be served by a different base station 105.

At 505, UE 115-*b* may transmit, to base station 105-*b*, a BSR for a first sidelink transmission to a device. In some cases, the device may be a third UE 115 not shown. At 510, UE 115-*b* may receive SCI from UE 115-*a* scheduling UE 115-*b* for a time resource for a second sidelink transmission from UE 115-*a*. The sidelink control information may include an indication of a serving cell identifier of UE 115-*a*.

At 515, UE 115-*b* may determine that the serving cell identifier for UE 115-*a* does not match the serving cell identifier for UE 115-*b*. Therefore, UE 115-*a* and UE 115-*b* may have different serving cells.

At 520, UE 115-*b* may receive, from base station 105-*b*, a grant scheduling the time resource for the first sidelink transmission, where the first sidelink transmission and the second sidelink transmission both being scheduled for the time resource corresponds to a half-duplex scheduling conflict for UE 115-*b*. UE 115-*b* may operate according to a half-duplex constraint, where UE 115-*b* may not be able to transmit and receive on a sidelink at the same time.

To resolve the half-duplex conflict, UE 115-*b* may transmit, to base station 105-*b*, a request to reconfigure the grant for the first sidelink transmission of UE 115-*b* based on the half-duplex scheduling conflict at 525. At 530, UE 115-*b* may receive a reconfigured grant scheduling UE 115-*b* for a different time resource than the second sidelink transmission.

At 535, UE 115-*b* may receive the second sidelink transmission from UE 115-*a* during the time resource. At 540, UE 115-*b* may transmit the first sidelink transmission to the device during the different time resource.

Figure 6:
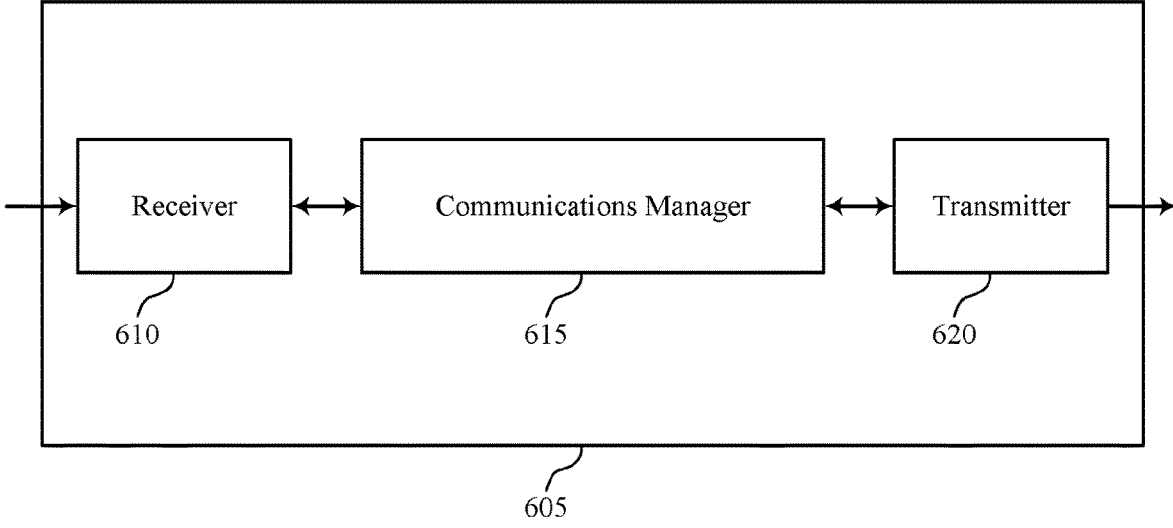
FIGS. 6 and 7 show block diagrams of devices that support coordinated sidelink resource allocation in accordance with aspects of the present disclosure.

FIG. 6 shows a block diagram 600 of a device 605 that supports coordinated sidelink resource allocation in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to coordinated sidelink resource allocation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, to a base station, a buffer status report for a first sidelink transmission to a device and receive, from a second UE, sidelink control information scheduling the first UE for a time resource for a second sidelink transmission from the second UE, the sidelink control information including an indication of a serving cell identifier of the second UE. The communications manager 615 may also transmit, to a base station, a buffer status report for a sidelink transmission to a first UE, receive, from the base station, a grant for the sidelink transmission during a time resource based on transmitting the buffer status report, and transmit, to the first UE, sidelink control information including an indication of the sidelink transmission during the time resource and an indication of a serving cell identifier. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 615 as described herein may be implemented to realize one or more potential advantages. One implementation may allow a UE 115 to improve throughput by avoiding half-duplex scheduling conflicts. IF these scheduling conflicts are not avoided, the UE 115 would drop one or both of the transmissions, as the UE 115 is not configured to both transmit and receive at the same time. This may further improve power performance at the UE 115, as the UE 115 may spend less energy scheduling and transmitting or receiving retransmissions of dropped sidelink communications.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
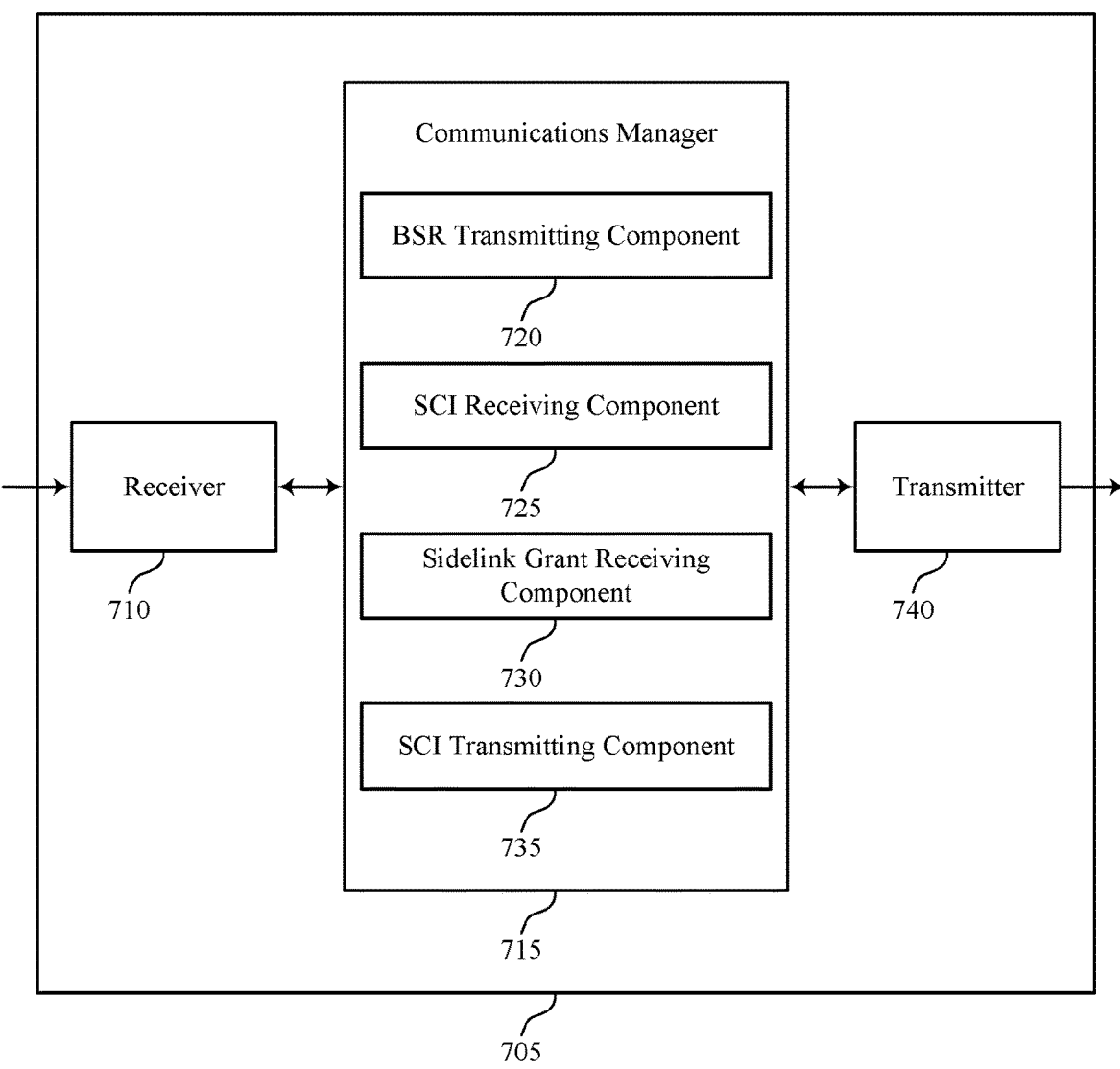

FIG. 7 shows a block diagram 700 of a device 705 that supports coordinated sidelink resource allocation in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to coordinated sidelink resource allocation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a BSR transmitting component 720, a SCI receiving component 725, a sidelink grant receiving component 730, and a SCI transmitting component 735. The communications manager 715 may be an example of aspects of the communications manager 910 described herein.

The BSR transmitting component 720 may transmit, to a base station, a buffer status report for a first sidelink transmission to a device.

The SCI receiving component 725 may receive, from a second UE, sidelink control information scheduling the first UE for a time resource for a second sidelink transmission from the second UE, the sidelink control information including an indication of a serving cell identifier of the second UE.

The BSR transmitting component 720 may transmit, to a base station, a buffer status report for a sidelink transmission to a first UE.

The sidelink grant receiving component 730 may receive, from the base station, a grant for the sidelink transmission during a time resource based on transmitting the buffer status report.

The SCI transmitting component 735 may transmit, to the first UE, sidelink control information including an indication of the sidelink transmission during the time resource and an indication of a serving cell identifier.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
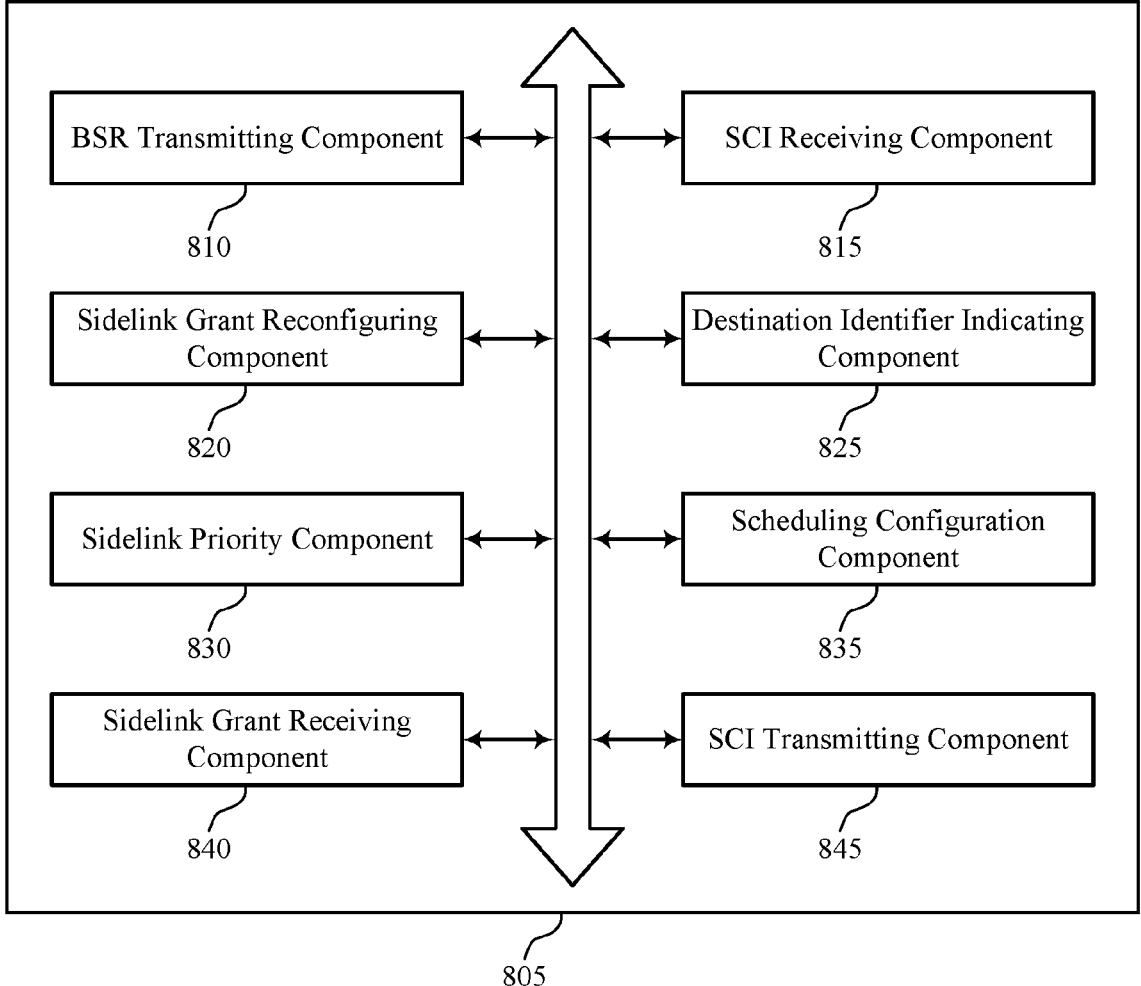
FIG. 8 shows a block diagram of a communications manager that supports coordinated sidelink resource allocation in accordance with aspects of the present disclosure.

FIG. 8 shows a block diagram 800 of a communications manager 805 that supports coordinated sidelink resource allocation in accordance with aspects of the present disclosure. The communications manager 805 may be an example of aspects of a communications manager 615, a communications manager 715, or a communications manager 910 described herein. The communications manager 805 may include a BSR transmitting component 810, a SCI receiving component 815, a sidelink grant reconfiguring component 820, a destination identifier indicating component 825, a sidelink priority component 830, a scheduling configuration component 835, a sidelink grant receiving component 840, and a SCI transmitting component 845. Each of these modules may communicate, directly or indirectly, with one another (e.g., via one or more buses).

The BSR transmitting component 810 may transmit, to a base station, a buffer status report for a first sidelink transmission to a device. In some examples, the BSR transmitting component 810 may transmit, to a base station, a buffer status report for a sidelink transmission to a first UE. The SCI receiving component 815 may receive, from a second UE, sidelink control information scheduling the first UE for a time resource for a second sidelink transmission from the second UE, the sidelink control information including an indication of a serving cell identifier of the second UE.

In some cases, the first sidelink transmission, the second sidelink transmission, or both, are transmitted via a PC5 interface. In some cases, the indication of the serving cell identifier corresponds to one or more least significant bits of the serving cell identifier of the second UE. The sidelink grant receiving component 840 may receive, from the base station, a grant for the sidelink transmission during a time resource based on transmitting the buffer status report. The SCI transmitting component 845 may transmit, to the first UE, sidelink control information including an indication of the sidelink transmission during the time resource and an indication of a serving cell identifier.

In some examples, the SCI transmitting component 845 may transmit the sidelink transmission to the first UE during the time resource. In some cases, the sidelink transmission is transmitted via a PC5 interface. In some cases, the indication of the serving cell identifier corresponds to one or more least significant bits of the serving cell identifier.

The sidelink grant reconfiguring component 820 may receive, from the base station, a grant scheduling the time resource for the first sidelink transmission, where the first sidelink transmission and the second sidelink transmission both being scheduled for the time resource corresponds to a half-duplex scheduling conflict for the first UE. In some examples, the sidelink grant reconfiguring component 820 may transmit, to the base station, a request to reconfigure the grant for the first sidelink transmission of the first UE based on the half-duplex scheduling conflict. In some examples, the sidelink grant reconfiguring component 820 may receive, from the base station, a reconfigured grant scheduling the first UE for a different time resource than the second sidelink transmission.

In some examples, the sidelink grant reconfiguring component 820 may determine the serving cell identifier for the second UE does not match the serving cell identifier for the first UE, where the request to reconfigure the grant is transmitted based on the determination. In some examples, the request to reconfigure the grant may be transmitted with feedback for the grant scheduling the time resource for the first sidelink transmission. In some examples, the sidelink grant reconfiguring component 820 may determine the serving cell identifier for the second UE does match the serving cell identifier for the first UE.

In some examples, the sidelink grant reconfiguring component 820 may receive, from the base station, a reconfigured grant for the sidelink transmission, where the reconfigured grant schedules the sidelink transmission for a different time resource based on transmitting the sidelink control information including the indication of the serving cell identifier. In some cases, the request to reconfigure the grant includes a bitmap of slots corresponding to a set of half-duplex scheduling conflicts including at least the half-duplex scheduling conflict. In some cases, the request to reconfigure the grant is transmitted based on receiving the sidelink control information, receiving the grant scheduling the first sidelink transmission, or both. In some cases, the request to reconfigure the grant is based on a priority of the first sidelink transmission, the second sidelink transmission, or both.

The destination identifier indicating component 825 may determine the serving cell identifier for the second UE matches the serving cell identifier for the first UE. In some examples, the destination identifier indicating component 825 may transmit an indicator of destination identifiers to the base station based on the serving cell identifier for the second UE matching the serving cell identifier for the first UE. In some examples, the destination identifier indicating component 825 may receive, from the base station, a grant for the first sidelink transmission scheduling the first UE for a different time resource than the second sidelink transmission. In some examples, the destination identifier indicating component 825 may receive the second sidelink transmission from the second UE during the time resource. In some examples, the destination identifier indicating component 825 may transmit the first sidelink transmission during the different time resource.

The sidelink priority component 830 may determine the first sidelink transmission is scheduled for the time resource with the second sidelink transmission. In some examples, the sidelink priority component 830 may determine the first sidelink transmission has a higher priority than the second sidelink transmission. In some examples, the sidelink priority component 830 may drop the second sidelink transmission based on the higher priority. In some examples, the sidelink priority component 830 may receive the first sidelink transmission.

The scheduling configuration component 835 may receive a configuration for avoiding half-duplex scheduling conflicts, where the first sidelink transmission and the second sidelink transmission are scheduled for a half-duplex scheduling conflict. In some examples, the scheduling configuration component 835 may transmit a configuration for avoiding half-duplex scheduling conflicts to the first UE via the sidelink control information. In some cases, the configuration for avoiding half-duplex scheduling conflicts is received by higher layer signaling, the sidelink control information, downlink control information including a sidelink grant, or a combination thereof. In some cases, the configuration for avoiding half-duplex scheduling conflicts is based on a first priority of the first sidelink transmission, a second priority of the second sidelink transmission, or both.

Figure 9:
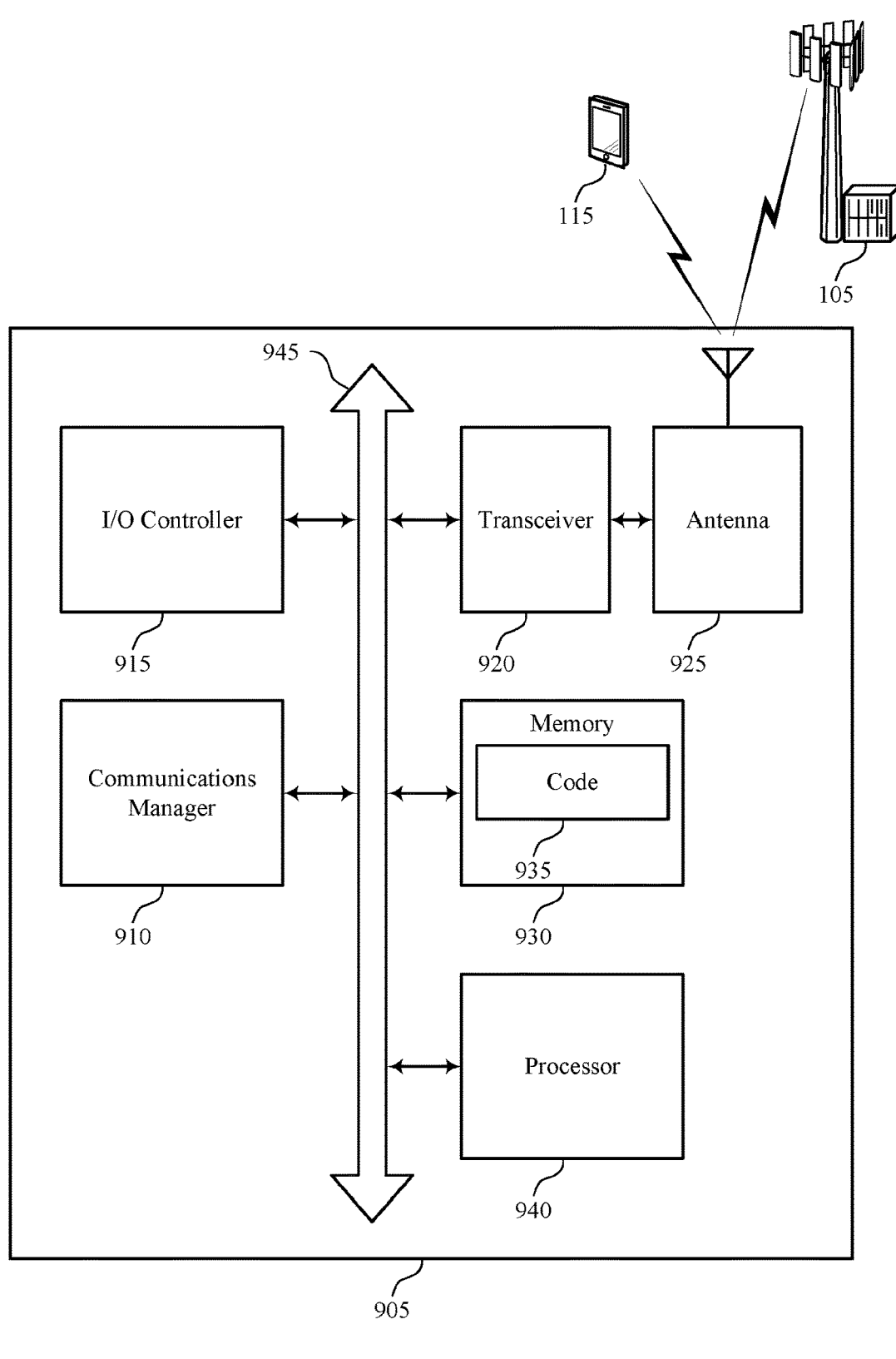
FIG. 9 shows a diagram of a system including a device that supports coordinated sidelink resource allocation in accordance with aspects of the present disclosure.

FIG. 9 shows a diagram of a system 900 including a device 905 that supports coordinated sidelink resource allocation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, to a base station, a buffer status report for a first sidelink transmission to a device and receive, from a second UE, sidelink control information scheduling the first UE for a time resource for a second sidelink transmission from the second UE, the sidelink control information including an indication of a serving cell identifier of the second UE. The communications manager 910 may also transmit, to a base station, a buffer status report for a sidelink transmission to a first UE, receive, from the base station, a grant for the sidelink transmission during a time resource based on transmitting the buffer status report, and transmit, to the first UE, sidelink control information including an indication of the sidelink transmission during the time resource and an indication of a serving cell identifier.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting coordinated sidelink resource allocation).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

FIG. 10 shows a block diagram 1000 of a device 1005 that supports coordinated sidelink resource allocation in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to coordinated sidelink resource allocation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a first UE, a first buffer status report, corresponding to a first sidelink transmission to a device and receive, from the first UE, an indicator of a half-duplex scheduling conflict for the first UE based on the first sidelink transmission from the first UE to the device and a second sidelink transmission from a second UE to the first UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
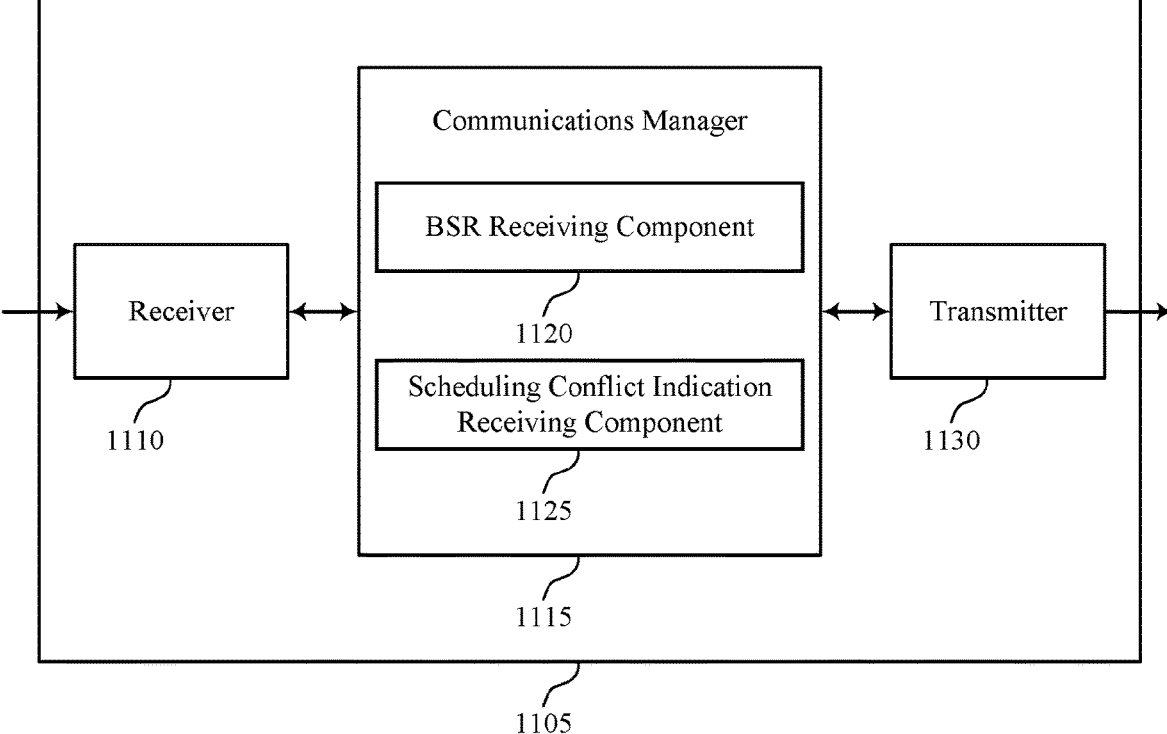

FIG. 11 shows a block diagram 1100 of a device 1105 that supports coordinated sidelink resource allocation in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to coordinated sidelink resource allocation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a BSR receiving component 1120 and a scheduling conflict indication receiving component 1125. The communications manager 1115 may be an example of aspects of the communications manager 1310 described herein.

The BSR receiving component 1120 may receive, from a first UE, a first buffer status report, corresponding to a first sidelink transmission to a device.

The scheduling conflict indication receiving component 1125 may receive, from the first UE, an indicator of a half-duplex scheduling conflict for the first UE based on the first sidelink transmission from the first UE to the device and a second sidelink transmission from a second UE to the first UE.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
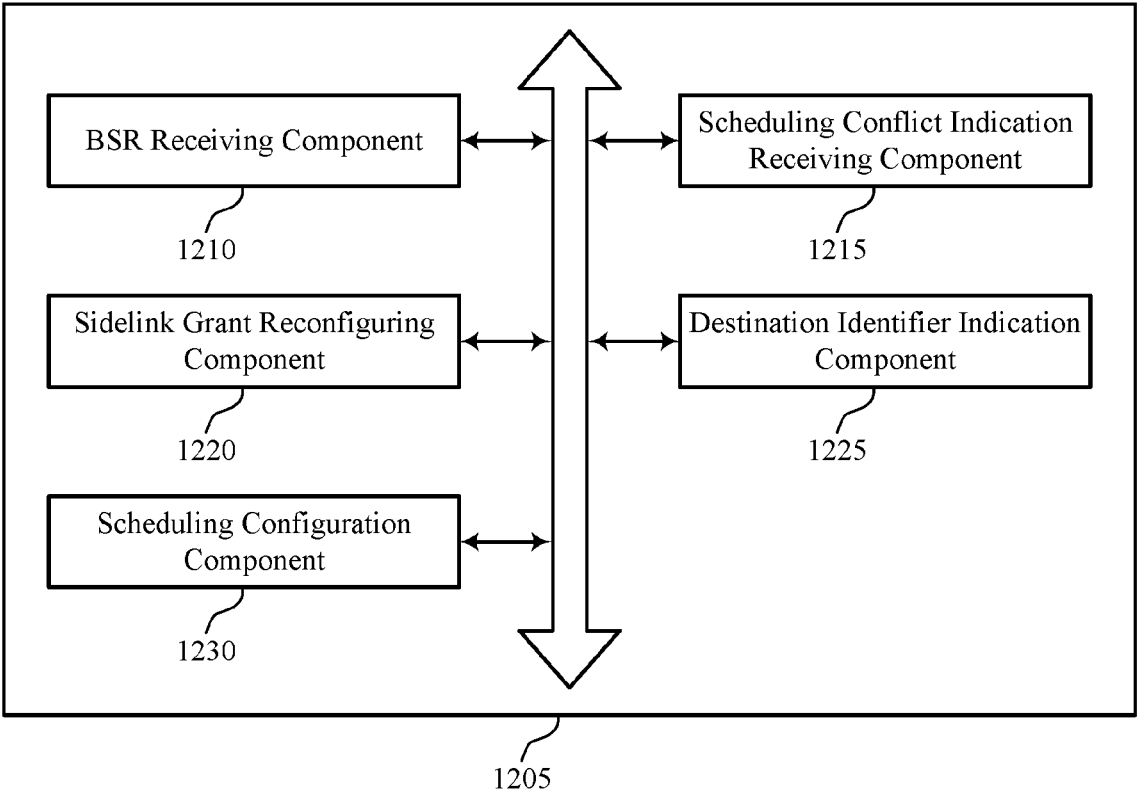
FIG. 12 shows a block diagram of a communications manager that supports coordinated sidelink resource allocation in accordance with aspects of the present disclosure.

FIG. 12 shows a block diagram 1200 of a communications manager 1205 that supports coordinated sidelink resource allocation in accordance with aspects of the present disclosure. The communications manager 1205 may be an example of aspects of a communications manager 1015, a communications manager 1115, or a communications manager 1310 described herein. The communications manager 1205 may include a BSR receiving component 1210, a scheduling conflict indication receiving component 1215, a sidelink grant reconfiguring component 1220, a destination identifier indication component 1225, and a scheduling configuration component 1230. Each of these modules may communicate, directly or indirectly, with one another (e.g., via one or more buses).

The BSR receiving component 1210 may receive, from a first UE, a first buffer status report, corresponding to a first sidelink transmission to a device. The scheduling conflict indication receiving component 1215 may receive, from the first UE, an indicator of a half-duplex scheduling conflict for the first UE based on the first sidelink transmission from the first UE to the device and a second sidelink transmission from a second UE to the first UE. In some cases, the first sidelink transmission, the second sidelink transmission, or both, are transmitted via a PC5 interface.

The sidelink grant reconfiguring component 1220 may transmit, to the first UE, a grant scheduling a time resource for the first sidelink transmission. In some examples, the sidelink grant reconfiguring component 1220 may receive, from the first UE, a request to reconfigure the grant for the first sidelink transmission based on the half-duplex scheduling conflict. In some examples, the sidelink grant reconfiguring component 1220 may transmit, to the first UE, a reconfigured grant for the first sidelink transmission based on the request and the half-duplex scheduling conflict. In some cases, the indicator includes a bitmap of slots corresponding to a set of half-duplex scheduling conflicts for the first UE including at least the half-duplex scheduling conflict. In some cases, the request to reconfigure the grant is received with feedback for the grant for the first sidelink transmission.

The destination identifier indication component 1225 may receive, from the second UE, a second buffer status report. In some examples, the destination identifier indication component 1225 may transmit, to the second UE, a second grant for the second sidelink transmission based on receiving the second buffer status report. In some examples, the destination identifier indication component 1225 may receive, from the first UE, an indicator of destination identifiers based on the second UE and the first UE having a matching serving cell identifier. In some examples, the destination identifier indication component 1225 may transmit, to the first UE, a grant for the first sidelink transmission scheduling the first UE for a different time resource than the second sidelink transmission based on the indicator of destination identifiers.

The scheduling configuration component 1230 may transmit a configuration for avoiding half-duplex scheduling conflicts via higher layer signaling, downlink control information including a sidelink grant, or both. In some cases, the configuration for avoiding half-duplex scheduling conflicts is based on a first priority of the first sidelink transmission, a second priority of the second sidelink transmission, or both.

Figure 13:
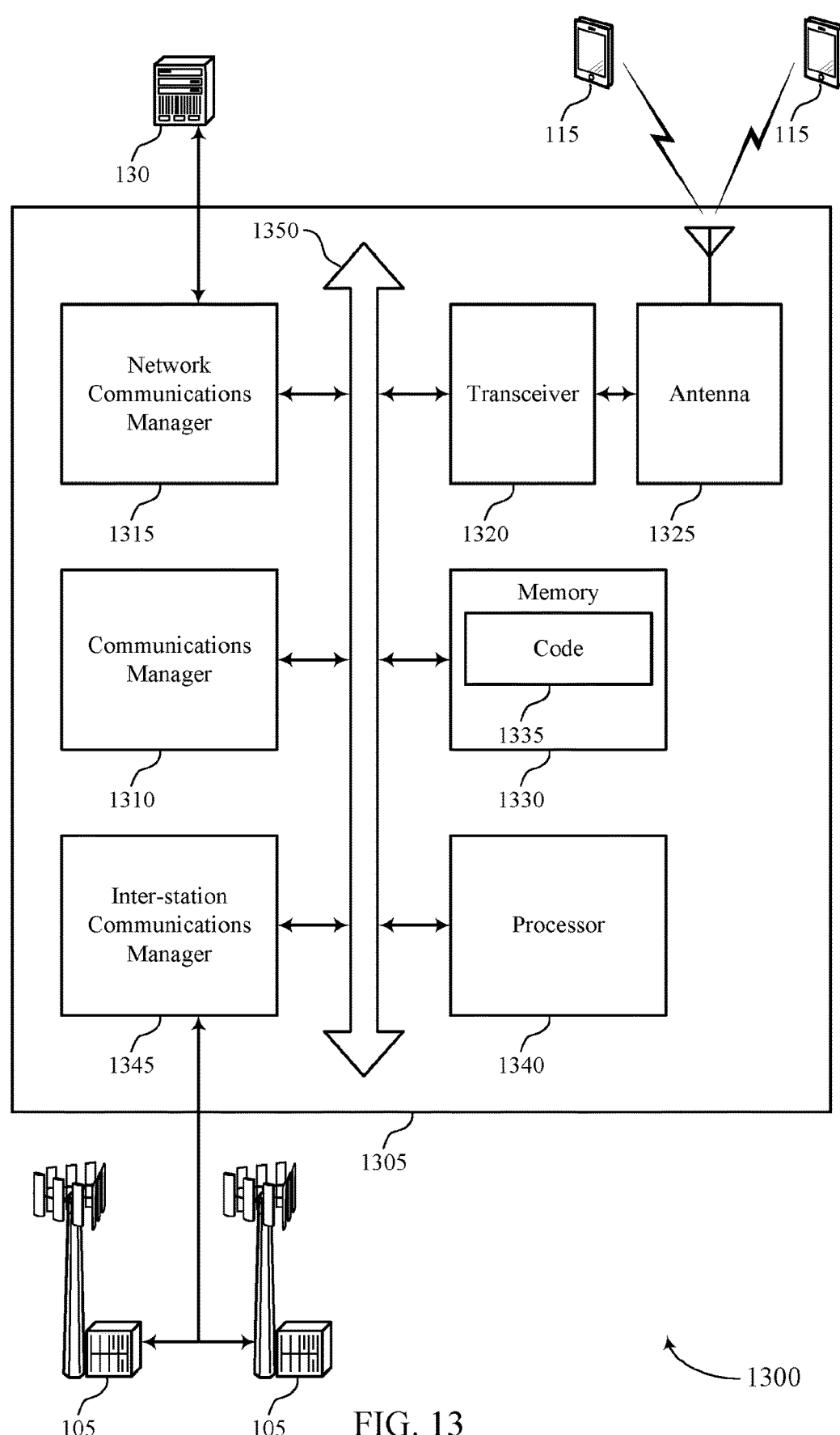
FIG. 13 shows a diagram of a system including a device that supports coordinated sidelink resource allocation in accordance with aspects of the present disclosure.

FIG. 13 shows a diagram of a system 1300 including a device 1305 that supports coordinated sidelink resource allocation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345.

These components may be in electronic communication via one or more buses (e.g., bus 1350).

The communications manager 1310 may receive, from a first UE, a first buffer status report, corresponding to a first sidelink transmission to a device and receive, from the first UE, an indicator of a half-duplex scheduling conflict for the first UE based on the first sidelink transmission from the first UE to the device and a second sidelink transmission from a second UE to the first UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting coordinated sidelink resource allocation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
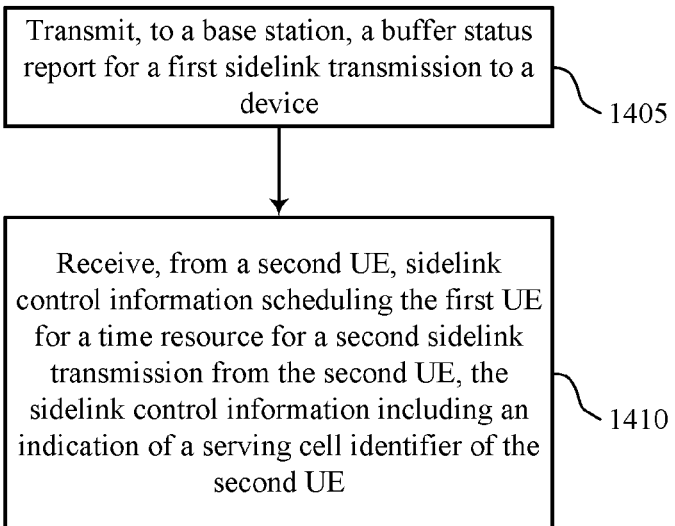

FIG. 14 shows a flowchart illustrating a method 1400 that supports coordinated sidelink resource allocation in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit, to a base station, a buffer status report for a first sidelink transmission to a device. The operations of 1405 may be performed according to the methods described herein. In some examples, aspects of the operations of 1405 may be performed by a BSR transmitting component as described with reference to FIGS. 6 through 9.

At 1410, the UE may receive, from a second UE, sidelink control information scheduling the first UE for a time resource for a second sidelink transmission from the second UE, the sidelink control information including an indication of a serving cell identifier of the second UE. The operations of 1410 may be performed according to the methods described herein. In some examples, aspects of the operations of 1410 may be performed by a SCI receiving component as described with reference to FIGS. 6 through 9.

FIG. 15 shows a flowchart illustrating a method 1500 that supports coordinated sidelink resource allocation in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, a buffer status report for a first sidelink transmission to a device. The operations of 1505 may be performed according to the methods described herein. In some examples, aspects of the operations of 1505 may be performed by a BSR transmitting component as described with reference to FIGS. 6 through 9.

At 1510, the UE may receive, from a second UE, sidelink control information scheduling the first UE for a time resource for a second sidelink transmission from the second UE, the sidelink control information including an indication of a serving cell identifier of the second UE. The operations of 1510 may be performed according to the methods described herein. In some examples, aspects of the operations of 1510 may be performed by a SCI receiving component as described with reference to FIGS. 6 through 9.

At 1515, the UE may receive, from the base station, a grant scheduling the time resource for the first sidelink transmission, where the first sidelink transmission and the second sidelink transmission both being scheduled for the time resource corresponds to a half-duplex scheduling conflict for the first UE. The operations of 1515 may be performed according to the methods described herein. In some examples, aspects of the operations of 1515 may be performed by a sidelink grant reconfiguring component as described with reference to FIGS. 6 through 9.

At 1520, the UE may transmit, to the base station, a request to reconfigure the grant for the first sidelink transmission of the first UE based on the half-duplex scheduling conflict. The operations of 1520 may be performed according to the methods described herein. In some examples, aspects of the operations of 1520 may be performed by a sidelink grant reconfiguring component as described with reference to FIGS. 6 through 9.

At 1525, the UE may receive, from the base station, a reconfigured grant scheduling the first UE for a different time resource than the second sidelink transmission. The operations of 1525 may be performed according to the methods described herein. In some examples, aspects of the operations of 1525 may be performed by a sidelink grant reconfiguring component as described with reference to FIGS. 6 through 9.

FIG. 16 shows a flowchart illustrating a method 1600 that supports coordinated sidelink resource allocation in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may transmit, to a base station, a buffer status report for a first sidelink transmission to a device. The operations of 1605 may be performed according to the methods described herein. In some examples, aspects of the operations of 1605 may be performed by a BSR transmitting component as described with reference to FIGS. 6 through 9.

At 1610, the UE may receive, from a second UE, sidelink control information scheduling the first UE for a time resource for a second sidelink transmission from the second UE, the sidelink control information including an indication of a serving cell identifier of the second UE. The operations of 1610 may be performed according to the methods described herein. In some examples, aspects of the operations of 1610 may be performed by a SCI receiving component as described with reference to FIGS. 6 through 9.

At 1615, the UE may determine the serving cell identifier for the second UE matches the serving cell identifier for the first UE. The operations of 1615 may be performed according to the methods described herein. In some examples, aspects of the operations of 1615 may be performed by a destination identifier indicating component as described with reference to FIGS. 6 through 9.

At 1620, the UE may transmit an indicator of destination identifiers to the base station based on the serving cell identifier for the second UE matching the serving cell identifier for the first UE. The operations of 1620 may be performed according to the methods described herein. In some examples, aspects of the operations of 1620 may be performed by a destination identifier indicating component as described with reference to FIGS. 6 through 9.

At 1625, the UE may receive, from the base station, a grant for the first sidelink transmission scheduling the first UE for a different time resource than the second sidelink transmission. The operations of 1625 may be performed according to the methods described herein. In some examples, aspects of the operations of 1625 may be performed by a destination identifier indicating component as described with reference to FIGS. 6 through 9.

FIG. 17 shows a flowchart illustrating a method 1700 that supports coordinated sidelink resource allocation in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may transmit, to a base station, a buffer status report for a sidelink transmission to a first UE. The operations of 1705 may be performed according to the methods described herein. In some examples, aspects of the operations of 1705 may be performed by a BSR transmitting component as described with reference to FIGS. 6 through 9.

At 1710, the UE may receive, from the base station, a grant for the sidelink transmission during a time resource based on transmitting the buffer status report. The operations of 1710 may be performed according to the methods described herein. In some examples, aspects of the operations of 1710 may be performed by a sidelink grant receiving component as described with reference to FIGS. 6 through 9.

At 1715, the UE may transmit, to the first UE, sidelink control information including an indication of the sidelink transmission during the time resource and an indication of a serving cell identifier. The operations of 1715 may be performed according to the methods described herein. In some examples, aspects of the operations of 1715 may be performed by a SCI transmitting component as described with reference to FIGS. 6 through 9.

Figure 18:
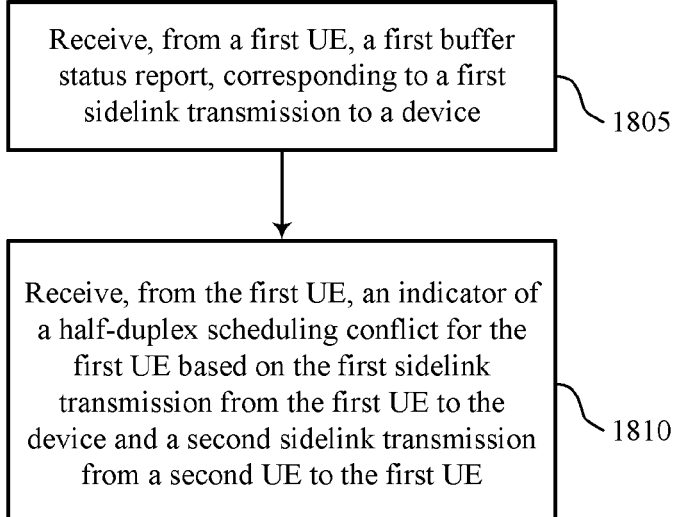

FIG. 18 shows a flowchart illustrating a method 1800 that supports coordinated sidelink resource allocation in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive, from a first UE, a first buffer status report, corresponding to a first sidelink transmission to a device. The operations of 1805 may be performed according to the methods described herein. In some examples, aspects of the operations of 1805 may be performed by a BSR receiving component as described with reference to FIGS. 10 through 13.

At 1810, the base station may receive, from the first UE, an indicator of a half-duplex scheduling conflict for the first UE based on the first sidelink transmission from the first UE to the device and a second sidelink transmission from a second UE to the first UE. The operations of 1810 may be performed according to the methods described herein. In some examples, aspects of the operations of 1810 may be performed by a scheduling conflict indication receiving component as described with reference to FIGS. 10 through 13.

FIG. 19 shows a flowchart illustrating a method 1900 that supports coordinated sidelink resource allocation in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may receive, from a first UE, a first buffer status report, corresponding to a first sidelink transmission to a device. The operations of 1905 may be performed according to the methods described herein. In some examples, aspects of the operations of 1905 may be performed by a BSR receiving component as described with reference to FIGS. 10 through 13.

At 1910, the base station may receive, from the second UE, a second buffer status report. The operations of 1910 may be performed according to the methods described herein. In some examples, aspects of the operations of 1910 may be performed by a destination identifier indication component as described with reference to FIGS. 10 through 13.

At 1915, the base station may transmit, to the second UE, a second grant for the second sidelink transmission based on receiving the second buffer status report. The operations of 1915 may be performed according to the methods described herein. In some examples, aspects of the operations of 1915 may be performed by a destination identifier indication component as described with reference to FIGS. 10 through 13.

At 1920, the base station may receive, from the first UE, an indicator of a half-duplex scheduling conflict for the first UE based on the first sidelink transmission from the first UE to the device and a second sidelink transmission from a second UE to the first UE. The operations of 1920 may be performed according to the methods described herein. In some examples, aspects of the operations of 1920 may be performed by a scheduling conflict indication receiving component as described with reference to FIGS. 10 through 13.

At 1925, the base station may receive, from the first UE, an indicator of destination identifiers based on the second UE and the first UE having a matching serving cell identifier. The operations of 1925 may be performed according to the methods described herein. In some examples, aspects of the operations of 1925 may be performed by a destination identifier indication component as described with reference to FIGS. 10 through 13.

At 1930, the base station may transmit, to the first UE, a grant for the first sidelink transmission scheduling the first UE for a different time resource than the second sidelink transmission based on the indicator of destination identifiers. The operations of 1930 may be performed according to the methods described herein. In some examples, aspects of the operations of 1930 may be performed by a destination identifier indication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Example 1 is a method for wireless communications at a first UE, that includes: transmitting, to a base station, a buffer status report for a first sidelink transmission to a device; and receiving, from a second UE, sidelink control information scheduling the first UE for a time resource for a second sidelink transmission from the second UE, the sidelink control information comprising an indication of a serving cell identifier of the second UE.

In example 2, the method of example 1 further includes: receiving, from the base station, a grant scheduling the time resource for the first sidelink transmission, wherein the first sidelink transmission and the second sidelink transmission both being scheduled for the time resource corresponds to a half-duplex scheduling conflict for the first UE; transmitting, to the base station, a request to reconfigure the grant for the first sidelink transmission of the first UE based at least in part on the half-duplex scheduling conflict; and receiving, from the base station, a reconfigured grant scheduling the first UE for a different time resource than the second sidelink transmission.

In example 3, the method of any of examples 1-2 further includes: determining the serving cell identifier for the second UE does not match the serving cell identifier for the first UE, wherein the request to reconfigure the grant is transmitted based at least in part on the determination.

In example 4, the request to reconfigure the grant any of examples 1-3 comprises a bitmap of slots corresponding to a set of half-duplex scheduling conflicts comprising at least the half-duplex scheduling conflict.

In example 5, the request to reconfigure the grant of any of examples 1~4 is transmitted with feedback for the grant scheduling the time resource for the first sidelink transmission.

In example 6, the request to reconfigure the grant of any of examples 1-5 is transmitted based at least in part on receiving the sidelink control information, receiving the grant scheduling the first sidelink transmission, or both.

In example 7, the request to reconfigure the grant of any of examples 1-6 is based at least in part on a priority of the first sidelink transmission, the second sidelink transmission, or both.

In example 8, the method of example 2-7 further includes: determining the serving cell identifier for the second UE does match the serving cell identifier for the first UE.

In example 9, the method of example 1 further includes: determining the serving cell identifier for the second UE matches the serving cell identifier for the first UE; transmitting an indicator of destination identifiers to the base station based at least in part on the serving cell identifier for the second UE matching the serving cell identifier for the first UE; and receiving, from the base station, a grant for the first sidelink transmission scheduling the first UE for a different time resource than the second sidelink transmission.

In example 10, the method of example 9 further includes: receiving the second sidelink transmission from the second UE during the time resource; and transmitting the first sidelink transmission during the different time resource.

In example 11, the method of any of examples 1-10 further includes: determining the first sidelink transmission is scheduled for the time resource with the second sidelink transmission; determining the first sidelink transmission has a higher priority than the second sidelink transmission;

dropping the second sidelink transmission based at least in part on the higher priority; and receiving the first sidelink transmission.

In example 12, the method of any of examples 1-11 further includes: receiving a configuration for avoiding half-duplex scheduling conflicts, wherein the first sidelink transmission and the second sidelink transmission are scheduled for a half-duplex scheduling conflict.

In example 13, the configuration for avoiding half-duplex scheduling conflicts of examples 12 is received by higher layer signaling, the sidelink control information, downlink control information comprising a sidelink grant, or a combination thereof.

In example 14, the configuration for avoiding half-duplex scheduling conflicts of example 12 is based at least in part on a first priority of the first sidelink transmission, a second priority of the second sidelink transmission, or both.

In example 15, the first sidelink transmission, the second sidelink transmission, or both, of any of examples 1-14 are transmitted via a PC5 interface.

In example 16, the indication of the serving cell identifier of any of examples 1-16 corresponds to one or more least significant bits of the serving cell identifier of the second UE.

Example 17 is a method for wireless communications at a second UE, that includes: transmitting, to a base station, a buffer status report for a sidelink transmission to a first UE; receiving, from the base station, a grant for the sidelink transmission during a time resource based at least in part on transmitting the buffer status report; and transmitting, to the first UE, sidelink control information comprising an indication of the sidelink transmission during the time resource and an indication of a serving cell identifier.

In example 18, the method of example 17 further includes: receiving, from the base station, a reconfigured grant for the sidelink transmission, wherein the reconfigured grant schedules the sidelink transmission for a different time resource based at least in part on transmitting the sidelink control information comprising the indication of the serving cell identifier.

In example 19, the method of any of examples 17-18 further includes: transmitting the sidelink transmission to the first UE during the time resource.

In example 20, the method of any of examples 17-19 further includes: transmitting a configuration for avoiding half-duplex scheduling conflicts to the first UE via the sidelink control information.

In example 21, the sidelink transmission of any of examples 17-20 is transmitted via a PC5 interface.

In example 22, the indication of the serving cell identifier of any of examples 17-21 corresponds to one or more least significant bits of the serving cell identifier.

Example 23 is a method for wireless communications at a base station, that includes: receiving, from a first UE, a first buffer status report, corresponding to a first sidelink transmission to a device; and receiving, from the first UE, an indicator of a half-duplex scheduling conflict for the first UE based at least in part on the first sidelink transmission from the first UE to the device and a second sidelink transmission from a second UE to the first UE.

In example 24, the method of example 23 further includes: transmitting, to the first UE, a grant scheduling a time resource for the first sidelink transmission; receiving, from the first UE, a request to reconfigure the grant for the first sidelink transmission based at least in part on the half-duplex scheduling conflict; and transmitting, to the first UE, a reconfigured grant for the first sidelink transmission based at least in part on the request and the half-duplex scheduling conflict.

In example 25, the indicator of examples 24-15 includes a bitmap of slots corresponding to a set of half-duplex scheduling conflicts for the first UE comprising at least the half-duplex scheduling conflict.

In example 26, the request to reconfigure the grant of any of examples 24-25 is received with feedback for the grant for the first sidelink transmission.

In example 27, the method of any of examples 23-26 further includes: receiving, from the second UE, a second buffer status report; transmitting, to the second UE, a second grant for the second sidelink transmission based at least in part on receiving the second buffer status report; receiving, from the first UE, an indicator of destination identifiers based at least in part on the second UE and the first UE having a matching serving cell identifier; and transmitting, to the first UE, a grant for the first sidelink transmission scheduling the first UE for a different time resource than the second sidelink transmission based at least in part on the indicator of destination identifiers.

In example 28, the method any of examples 23-27 further includes: transmitting a configuration for avoiding half-duplex scheduling conflicts via higher layer signaling, downlink control information comprising a sidelink grant, or both.

In example 29, the configuration for avoiding half-duplex scheduling conflicts of example 28 is based at least in part on a first priority of the first sidelink transmission, a second priority of the second sidelink transmission, or both.

In example 30, the first sidelink transmission, the second sidelink transmission, or both, of any of examples 23-29 are transmitted via a PC5 interface.

Example 31 is a system or apparatus including means for implementing a method or realizing an apparatus as in any of examples 1-16.

Example 32 is a non-transitory computer-readable medium storing instructions executable by one or more processors to cause the one or more processors to implement a method as in any of examples 1-16.

Example 33 is a system including one or more processors and memory in electronic communication with the one or more processors storing instructions executable by the one or more processors to cause the system or apparatus to implement a method as in any of examples 1-16.

Example 34 is a system or apparatus including means for implementing a method or realizing an apparatus as in any of examples 17-22.

Example 35 is a non-transitory computer-readable medium storing instructions executable by one or more processors to cause the one or more processors to implement a method as in any of examples 17-22.

Example 36 is a system including one or more processors and memory in electronic communication with the one or more processors storing instructions executable by the one or more processors to cause the system or apparatus to implement a method as in any of examples 17-22.

Example 37 is a system or apparatus including means for implementing a method or realizing an apparatus as in any of examples 23-30.

Example 38 is a non-transitory computer-readable medium storing instructions executable by one or more processors to cause the one or more processors to implement a method as in any of examples 23-30.

Example 39 is a system including one or more processors and memory in electronic communication with the one or more processors storing instructions executable by the one or more processors to cause the system or apparatus to implement a method as in any of examples 23-30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
    transmitting, to a network entity, a buffer status report for a first sidelink transmission to a device; and
    receiving, from a second UE and based at least in part on transmitting the buffer status report, sidelink control information scheduling the first UE for a time resource for a second sidelink transmission from the second UE, the sidelink control information comprising an indication of a serving cell identifier of the second UE, wherein the serving cell identifier corresponds to one of the network entity or a second network entity associated with the second UE.

2. A first user equipment (UE) for wireless communications, comprising:
    one or more memories storing processor-executable code; and
    one or more processors coupled with the one or more memories and operable to execute the code to cause the first UE to:
        transmit, to a network entity, a buffer status report for a first sidelink transmission to a device; and
        receive, from a second UE and based at least in part on transmission of the buffer status report, sidelink control information scheduling the first UE for a time resource for a second sidelink transmission from the second UE, the sidelink control information comprising an indication of a serving cell identifier of the second UE, wherein the serving cell identifier corresponds to one of the network entity or a second network entity associated with the second UE.

3. The first UE of claim 2, wherein the one or more processors are further operable to execute the code to cause the first UE to:
    receive, from the network entity, a grant scheduling the time resource for the first sidelink transmission, wherein the first sidelink transmission and the second sidelink transmission both being scheduled for the time resource corresponds to a half-duplex scheduling conflict for the first UE;
    transmit, to the network entity, a request to reconfigure the grant for the first sidelink transmission of the first UE based at least in part on the half-duplex scheduling conflict; and
    receive, from the network entity, a reconfigured grant scheduling the first UE for a different time resource than the second sidelink transmission.

4. The first UE of claim 3, wherein the one or more processors are further operable to execute the code to cause the first UE to:
    determine the serving cell identifier for the second UE does not match the serving cell identifier for the first UE, wherein the request to reconfigure the grant is transmitted based at least in part on the determination.

5. The first UE of claim 3, wherein the request to reconfigure the grant comprises a bitmap of slots corresponding to a set of half-duplex scheduling conflicts comprising at least the half-duplex scheduling conflict.

6. The first UE of claim 3, wherein the request to reconfigure the grant is transmitted with feedback for the grant scheduling the time resource for the first sidelink transmission.

7. The first UE of claim 3, wherein the request to reconfigure the grant is transmitted based at least in part on receiving the sidelink control information, receiving the grant scheduling the first sidelink transmission, or both.

8. The first UE of claim 3, wherein the request to reconfigure the grant is based at least in part on a priority of the first sidelink transmission, the second sidelink transmission, or both.

9. The first UE of claim 3, wherein the one or more processors are further operable to execute the code to cause the first UE to:

determine the serving cell identifier for the second UE does match the serving cell identifier for the first UE.

10. The first UE of claim 2, wherein the one or more processors are further operable to execute the code to cause the first UE to:

determine the serving cell identifier for the second UE matches the serving cell identifier for the first UE;

transmit an indicator of destination identifiers to the network entity based at least in part on the serving cell identifier for the second UE matching the serving cell identifier for the first UE; and receive, from the network entity, a grant for the first sidelink transmission scheduling the first UE for a different time resource than the second sidelink transmission.

11. The first UE of claim 10, wherein the one or more processors are further operable to execute the code to cause the first UE to:

receive the second sidelink transmission from the second UE during the time resource; and transmit the first sidelink transmission during the different time resource.

12. The first UE of claim 2, wherein the one or more processors are further operable to execute the code to cause the first UE to:

determine the first sidelink transmission is scheduled for the time resource with the second sidelink transmission;

determine the first sidelink transmission has a higher priority than the second sidelink transmission;

drop the second sidelink transmission based at least in part on the higher priority; and receive the first sidelink transmission.

13. The first UE of claim 2, wherein the one or more processors are further operable to execute the code to cause the first UE to:

receive a configuration for avoiding half-duplex scheduling conflicts, wherein the first sidelink transmission and the second sidelink transmission are scheduled for a half-duplex scheduling conflict.

14. The first UE of claim 13, wherein the configuration for avoiding half-duplex scheduling conflicts is received by higher layer signaling, the sidelink control information, downlink control information comprising a sidelink grant, or a combination thereof.

15. The first UE of claim 13, wherein the configuration for avoiding half-duplex scheduling conflicts is based at least in part on a first priority of the first sidelink transmission, a second priority of the second sidelink transmission, or both.

16. The first UE of claim 2, wherein the first sidelink transmission, the second sidelink transmission, or both, are transmitted via a PC5 interface.

17. The first UE of claim 2, wherein the indication of the serving cell identifier corresponds to one or more least significant bits of the serving cell identifier of the second UE.

18. A second user equipment (UE) for wireless communications, comprising:

one or more memories storing processor-executable code; and one or more processors coupled with the one or more memories and operable to execute the code to cause the second UE to:

transmit, to a network entity, a buffer status report for a sidelink transmission to a first UE;

receive, from the network entity, a grant for the sidelink transmission during a time resource based at least in part on transmitting the buffer status report; and transmit, to the first UE based at least in part on receiving the grant, sidelink control information comprising an indication of the sidelink transmission during the time resource and an indication of a serving cell identifier corresponding to the network entity.

19. The second UE of claim 18, wherein the one or more processors are further operable to execute the code to cause the second UE to:

receive, from the network entity, a reconfigured grant for the sidelink transmission, wherein the reconfigured grant schedules the sidelink transmission for a different time resource based at least in part on transmitting the sidelink control information comprising the indication of the serving cell identifier.

20. The second UE of claim 18, wherein the one or more processors are further operable to execute the code to cause the second UE to:

transmit the sidelink transmission to the first UE during the time resource.

21. The second UE of claim 18, wherein the one or more processors are further operable to execute the code to cause the second UE to:

transmit a configuration for avoiding half-duplex scheduling conflicts to the first UE via the sidelink control information.

22. The second UE of claim 18, wherein the sidelink transmission is transmitted via a PC5 interface.

23. The second UE of claim 18, wherein the indication of the serving cell identifier corresponds to one or more least significant bits of the serving cell identifier.

24. A network entity for wireless communications, comprising:

one or more memories storing processor-executable code; and one or more processors coupled with the one or more memories and operable to execute the code to cause the network entity to:

receive, from a first user equipment (UE), a first buffer status report, corresponding to a first sidelink communication for transmission from the first UE to a device; and receive, from the first UE, an indicator of a half-duplex scheduling conflict for the first UE, wherein the half-duplex scheduling conflict is between the first sidelink communication for transmission from the first UE to the device and a second sidelink communication for reception by the first UE and transmission by a second UE.

25. The network entity of claim 24, wherein the one or more processors are further operable to execute the code to cause the network entity to:

transmit, to the first UE, a grant scheduling a time resource for the first sidelink transmission;

receive, from the first UE, a request to reconfigure the grant for the first sidelink transmission based at least in part on the half-duplex scheduling conflict; and transmit, to the first UE, a reconfigured grant for the first sidelink transmission based at least in part on the request and the half-duplex scheduling conflict.

26. The network entity of claim 25, wherein the indicator comprises a bitmap of slots corresponding to a set of half-duplex scheduling conflicts for the first UE comprising at least the half-duplex scheduling conflict.

27. The network entity of claim 25, wherein the request to reconfigure the grant is received with feedback for the grant for the first sidelink transmission.

28. The network entity of claim 24, wherein the one or more processors are further operable to execute the code to cause the network entity to:

receive, from the second UE, a second buffer status report;

transmit, to the second UE, a second grant for the second sidelink transmission based at least in part on receiving the second buffer status report;

receive, from the first UE, an indicator of destination identifiers based at least in part on the second UE and the first UE having a matching serving cell identifier; and transmit, to the first UE, a grant for the first sidelink transmission scheduling the first UE for a different time resource than the second sidelink transmission based at least in part on the indicator of destination identifiers.

29. The network entity of claim 24, wherein the one or more processors are further operable to execute the code to cause the network entity to:

transmit a configuration for avoiding half-duplex scheduling conflicts via higher layer signaling, downlink control information comprising a sidelink grant, or both.

30. The network entity of claim 29, wherein the configuration for avoiding half-duplex scheduling conflicts is based at least in part on a first priority of the first sidelink transmission, a second priority of the second sidelink transmission, or both.

* * * * *